(12) United States Patent
Xie et al.

(10) Patent No.: US 6,377,477 B1
(45) Date of Patent: Apr. 23, 2002

(54) SELF-DRIVEN SYNCHRONOUS RECTIFIER BY RETENTION OF GATE CHARGE

(75) Inventors: Xue Fei Xie, Hong Kong; Ngai Kit Poon, Kowloon; Pong Liu, Kwai Hing; Hay Pong, Ap Lei Chau, all of (HK)

(73) Assignee: University of Hong Kong, Hong Kong (HK)

(*) Notice: Subject to any disclaimer, the term of this patent is extended or adjusted under 35 U.S.C. 154(b) by 0 days.

(21) Appl. No.: 09/615,382

(22) Filed: Feb. 21, 2001

Related U.S. Application Data

(60) Provisional application No. 60/144,127, filed on Jul. 16, 1999.

(51) Int. Cl.[7] .............................................. H02M 3/335
(52) U.S. Cl. .................. 363/21.14; 363/20; 363/21.06; 363/21.12
(58) Field of Search .................. 363/18, 21.06, 363/21.14, 21.12, 19, 20

(56) References Cited

U.S. PATENT DOCUMENTS

| | | | |
|---|---|---|---|
| 4,017,745 A | 4/1977 | McMahon | 307/254 |
| 5,067,066 A | 11/1991 | Chida | 363/16 |
| 5,245,520 A | 9/1993 | Imbertson | 363/17 |
| 5,457,624 A | 10/1995 | Hastings | 363/127 |
| 5,625,541 A * | 4/1997 | Rozman | 363/21.06 |
| 5,659,463 A | 8/1997 | Lee | 363/25 |
| 5,663,635 A | 9/1997 | Vinciarelli et al. | 323/282 |
| 5,668,466 A | 9/1997 | Vinciarelli et al. | 323/282 |
| 5,708,571 A * | 1/1998 | Shinada | 363/16 |
| 5,861,734 A | 1/1999 | Fasullo et al. | 323/222 |
| 5,880,940 A | 3/1999 | Poon | 363/20 |
| RE36,571 E * | 2/2000 | Rozman | 363/21.06 |
| 6,038,148 A * | 3/2000 | Farrington et al. | 363/21.06 |
| 6,181,578 B1 | 1/2001 | Fronk | 363/21 |

* cited by examiner

*Primary Examiner*—Bao Q. Vu
(74) *Attorney, Agent, or Firm*—Jones, Day, Reavis & Pogue

(57) ABSTRACT

A synchronous rectifier is disclosed, which makes use of gate charge retention technique. In a forward converter after the main transformer is reset its secondary voltage diminishes to zero. For self-driven synchronous rectifiers the driving voltage is lost and current is forced to go through body diode with high conduction loss. Active clamp is a method to get around the problem but it requires an active switch on the primary side. The present invention introduces gate charge retention method by, which no additional active switch is required on the primary side. Synchronous rectifiers are kept on even after the main transformer is reset and secondary voltage diminished to zero. This synchronous rectifier avoids effect of leakage inductance in converter transformer windings and operates at high efficiency. This synchronous rectifier can operate in a number of circuit topologies.

42 Claims, 21 Drawing Sheets

SELF-DRIVEN SYNCHRONOUS RECTIFIER BY RETENTION OF GATE CHARGE

This application claims benefit to domestic priority of Ser. No. 60/144,127 filed Jul. 16, 1999.

FIELD OF THE INVENTION

This invention relates to the field of switch mode power converters and, in particular, to the field of synchronous rectification for high efficiency converters.

BACKGROUND OF THE INVENTION

With the ever-increasing demand in the power electronics market for low voltage, high current power converters, power supply designers are faced with the challenge of designing high efficiency converters in smaller physical sizes. For converters with output voltages as low as 2.2V or lower, the state of the art schottky diodes have limited utility because their forward voltage drop of 0.3V is still unacceptably high. To achieve an overall efficiency as high as 90%, the rectification stage voltage drop would have to be lower than 0.1V. Only with synchronous rectification MOSFETs can one possibly approach achieving this goal. The performance of synchronous rectification, however, is not always superior to traditional schottky diode rectification. This is especially true when the driving signal timing and the driving voltage level of synchronous rectifiers are not well designed.

There are two primary methods for controlling synchronous rectifiers: the self-driven method and the controller driven method. In isolated power conversion, the controller driven method is usually more complex and costly than its self-driven counterpart, so it is not preferred.

There are two types of self-driven methods: the voltage driven method and the current driven method. A current driven synchronous rectifier uses current sensing to control the switching times. The current driven rectifier requires additional current sensing components such as current transformer or current sensing MOSFET thereby increasing circuit complexity. A voltage driven synchronous rectification is attractive for its simplicity. The driving signals for the voltage driven synchronous rectifier can be derived from the main transformer windings or output inductor coupled windings.

Among various isolated topologies, the forward topology is one of the most suitable topologies for low voltage power conversion because it is the simplest derivation of isolated step-down topology, however it has shortcomings. A prior art synchronous rectifier, as shown in FIG. 1A, uses the secondary winding of the main transformer to drive the synchronous rectifier. The gates of the synchronous MOSFETs S1 and S2 are connected to two terminals of the main transformer secondary winding. Alternating voltage at the secondary winding drives the MOSFETs S1 and S2 in synchronism with the converter main switch S.

The main drawback of this topology is conduction through the body diode of the synchronous MOSFETs when magnetizing current resets to zero. When this happens, the voltage at the transformer secondary becomes zero as shown in FIG. 1B. The time period when this occurs is normally called the dead time. During this dead time period, a freewheeling synchronous rectifier is not driven on but there is output current flowing through it nonetheless. This is because current is flowing through the body diode of the synchronous rectifier. The body diode of a MOSFET has a higher forward voltage drop and poorer reverse recovery characteristic than a normal fast recovery diode. So during this dead time period, the loss is much higher with the synchronous rectifier than with a traditional diode rectifier. The advantages of synchronous rectifiers is greatly compromised because of diode body conduction during dead time periods.

Efforts to address the body diode conduction problem include the active clamp method as shown if FIG. 2A. With the help of an auxiliary switch SA, which is coupled to a precharged capacitor, magnetizing energy is recovered and transformer dead time can be reduced to a very short time period. The active clamp method is effective and provides complementary signals to drive two synchronous MOSFETs. But, it requires an additional floating switch SA on the primary side, which is costly together with its associated circuitry.

In U.S. Pat. No. 5,886,881, Xia put the active clamp switch on the secondary side. But, to do this a p-channel MOSFET was needed, which has much inferior parameter values than an n-channel MOSFET.

In U.S. Pat. No. 5,343,383, Shinada attempted to increase the response speed of synchronous rectifiers by driving the gates through capacitors. This reference, however, does not attempt to solve the dead time problem and does not prevent MOSFET body diode conduction when in the presence of transformer leakage inductance.

Other systems have proposed methods for keeping synchronous rectifiers turned on during dead time. But, they attempt this by reducing the input voltage range of the converter.

Therefore, there remains a need in this art for a system for overcoming the body diode conduction problem in synchronous rectifiers without adding costly components, inferior components and without reducing the input voltage range of the converter.

SUMMARY OF THE INVENTION

The present invention overcomes the problems noted above and satisfies the needs in this field for a system for overcoming the body diode conduction problem in synchronous rectifiers during dead time.

The present invention provides a simple system for eliminating the problem of body diode conduction without using the active clamp method. The present invention utilizes a retention of gate charge technique wherein the gate charge is retained during dead time until it is released at the end of a switching period. As a result, the synchronous rectifier remains turned on during dead time without a primary clamp circuit and without body diode conduction.

Because transformer leakage inductance may delay the switching of the synchronous MOSFETs, the present invention provides a system that employs an auxiliary winding to drive the synchronous MOSFETs.

The present invention is very versatile since it can be used in many topologies. Disclosed are several embodiments for use with current doubler topologies, topologies with center-tapped secondary windings, and forward converter topologies.

Accordingly, it is an object of the present invention to provide high efficiency self-driven synchronous rectifier circuits for low voltage power supply apparatus.

It is another object of the present invention to use the voltage sensing method for its simplicity.

It is another object of the present invention to enable synchronous rectifiers to remain conducting during dead time without using active clamp circuit on the primary side.

It is another object of the present invention to avoid the effect of leakage inductance in the main transformer of a converter.

It is another object of the present invention to provide synchronous rectification to a wide range of power converter topologies.

In accordance with the present invention a synchronous rectifier system for a power converter is provided. The system comprises a transformer having a first secondary winding; a first synchronous switch coupled to the transformer secondary, and a second synchronous switch coupled to the transformer secondary. The system further comprises a state retention device coupled to the second synchronous switch, the state retention device being operative to allow the second synchronous switch to remain in a conduction state when the voltage across the transformer secondary approaches zero volts; and a state release switch coupled to the second synchronous switch, the state release switch being operative to direct the second synchronous switch to switch to a non-conducting state when the first synchronous switch is directed to switch to a conducting state.

BRIEF DESCRIPTION OF THE DRAWINGS

The present invention will become apparent from the following description when read in conjunction with the accompanying drawings wherein.

DETAILED DESCRIPTION OF THE PREFERRED EMBODIMENT

Figure 1A:
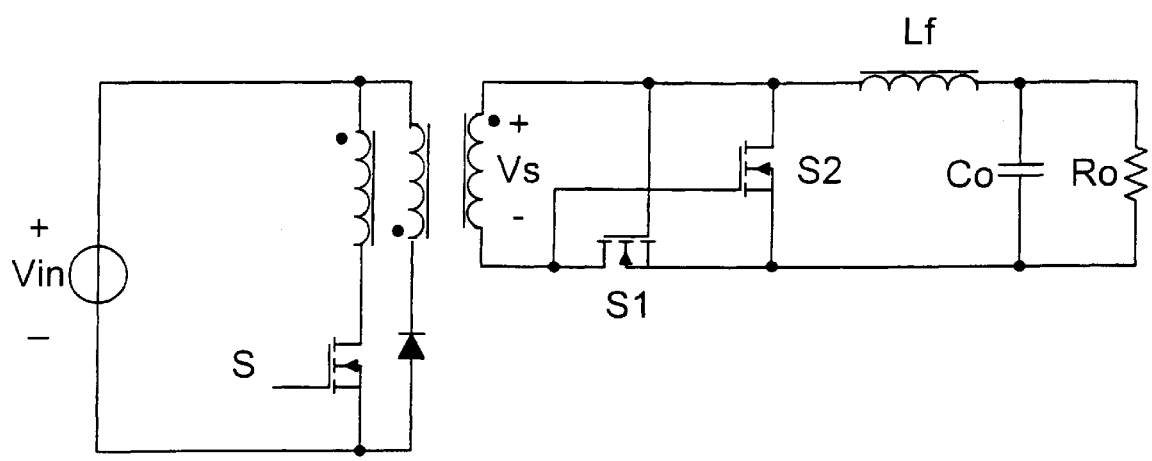
FIG. 1A is a prior art forward converter with self driven synchronous rectifier.
Figure 1B:
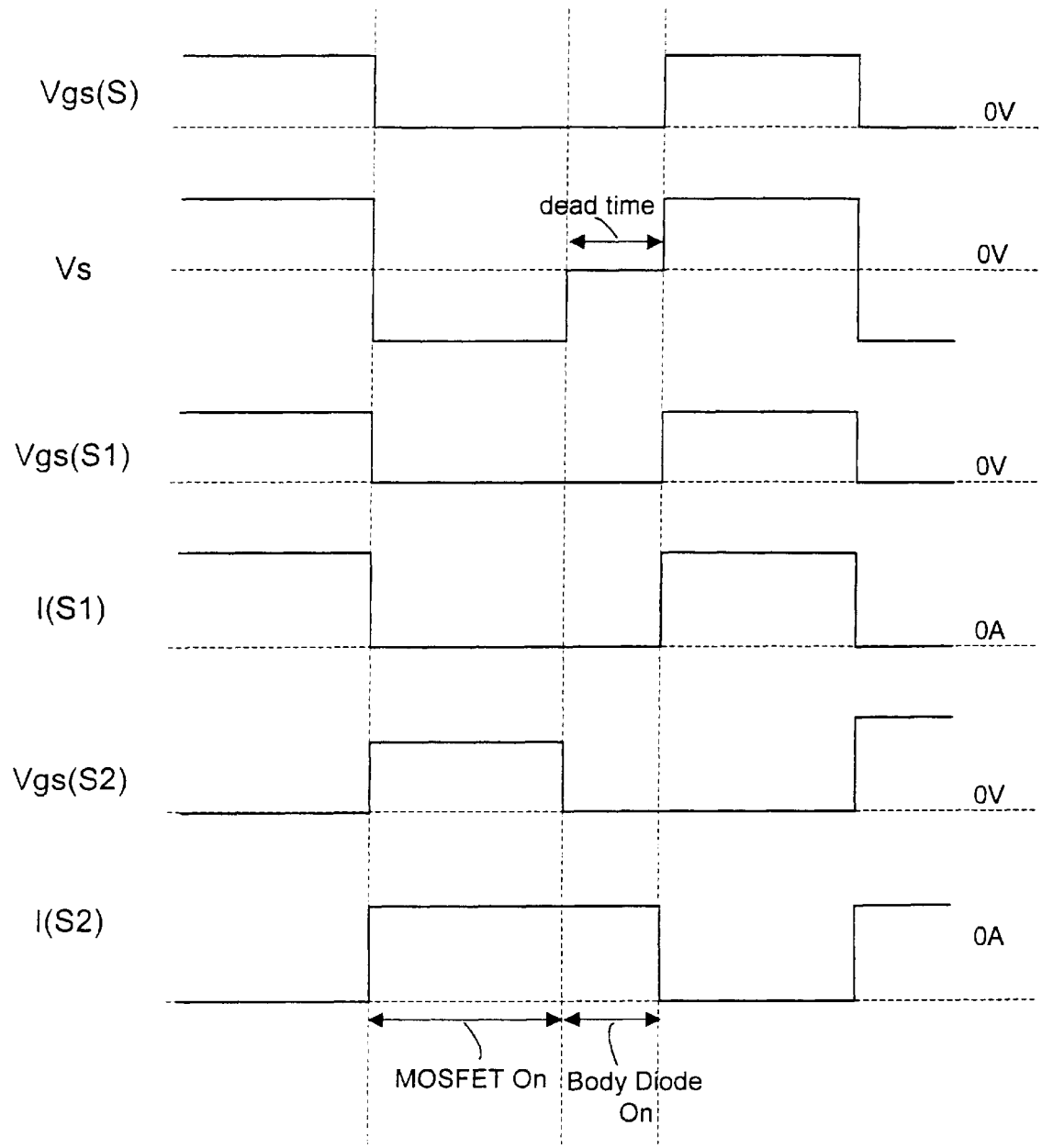
FIG. 1B shows waveforms for the prior art forward converter of FIG. 1A.
Figure 2A:
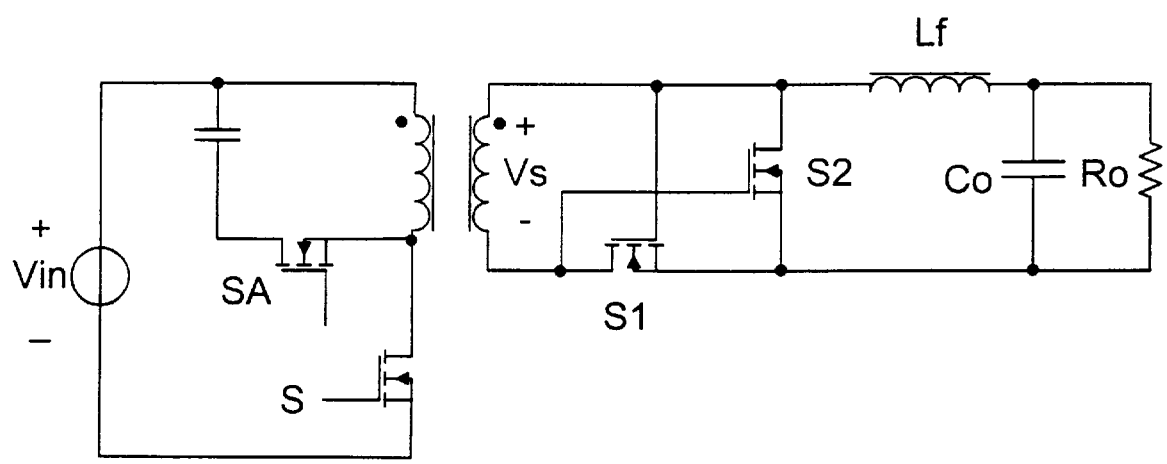
FIG. 2A is a prior art forward converter with a synchronous rectifier and active clamp circuit.
Figure 2B:
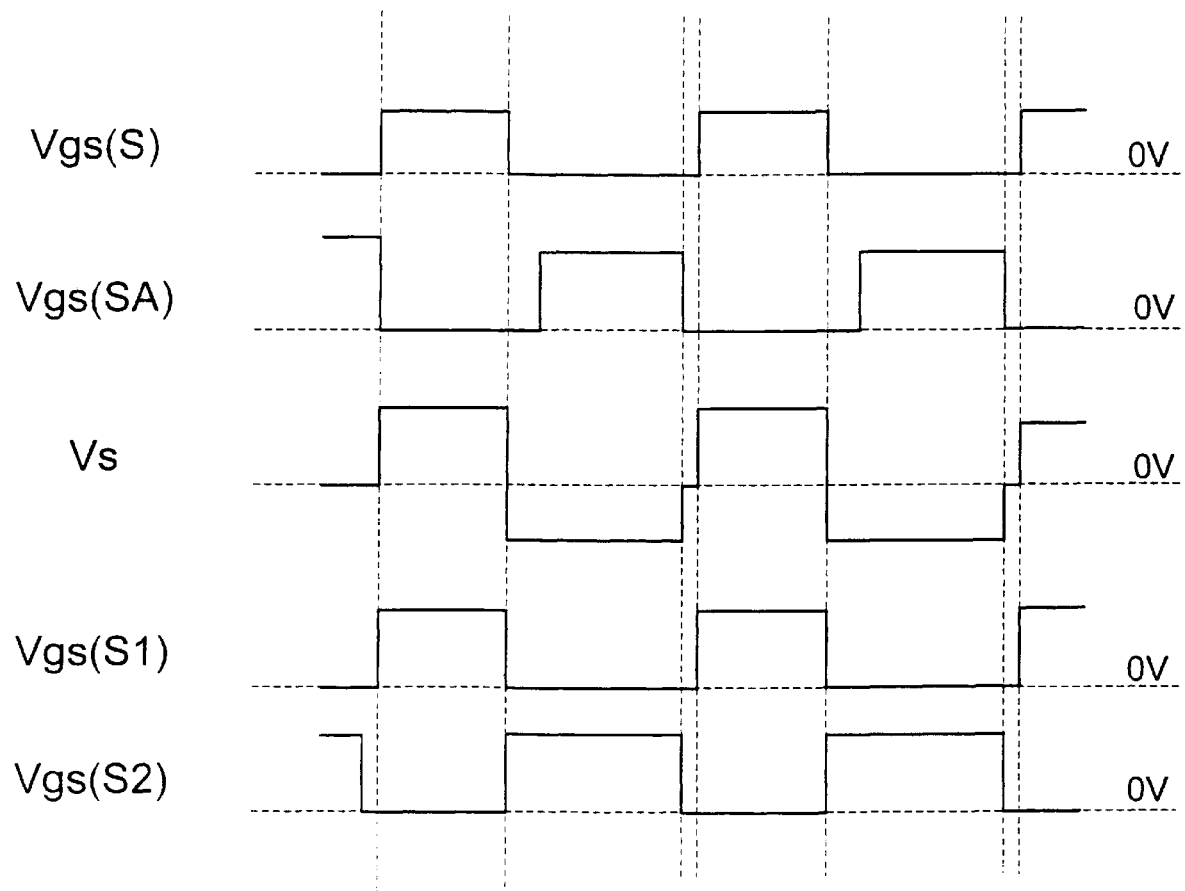
FIG. 2B shows waveforms for the prior art forward converter in FIG. 2A.
Figure 3:
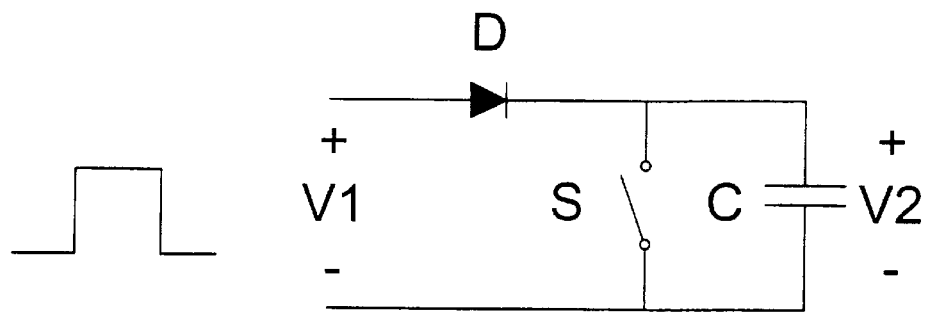
FIG. 3 shows the principle of charge retention.
Figure 3:
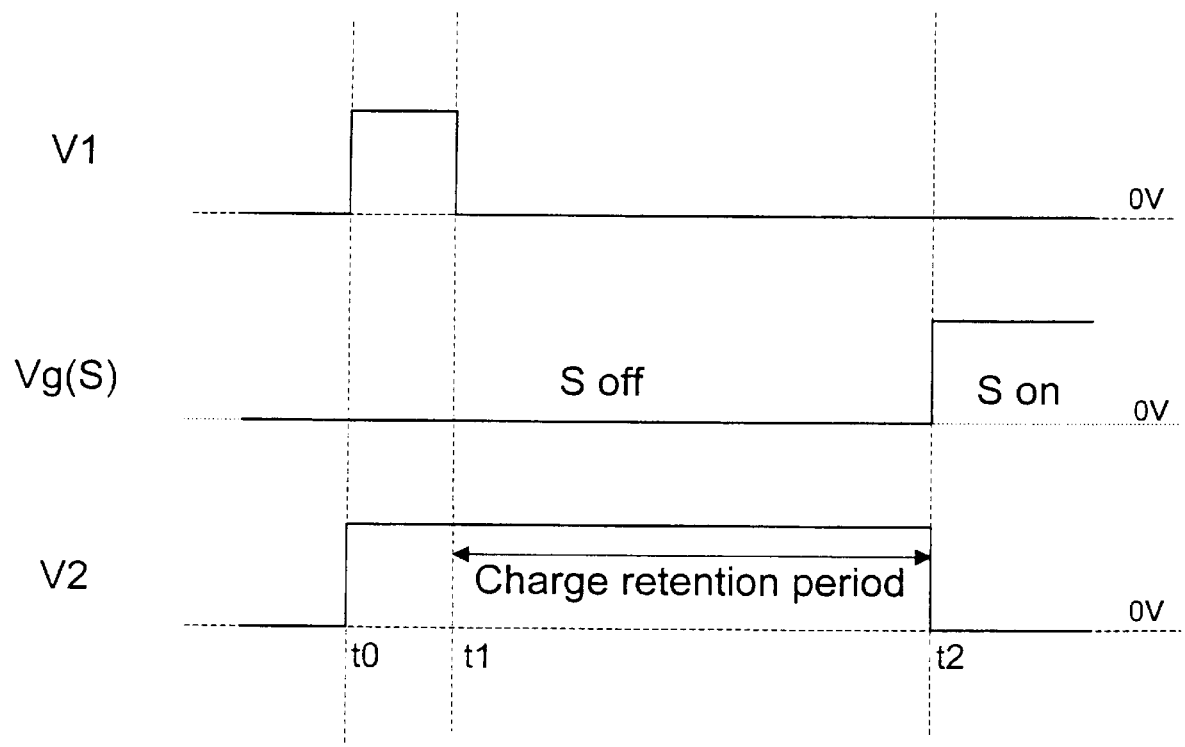

Referring now to the drawings, the principle of gate charge retention is illustrated in FIG. 3. Switch S is off and the initial voltage of capacitor C is zero before t0. At time t0, driving signal V1 becomes positive. Assuming that the capacitance value of capacitor C is small, capacitor voltage V2 also becomes positive because of the charging current through the diode D. When the driving signal V1 drops to zero at t1, diode D is reverse biased and charge remains on capacitor C provided switch S is off. So voltage V2 remains positive until switch S is turned on at time t2, and capacitor C is discharged through switch S.

Figure 4A:
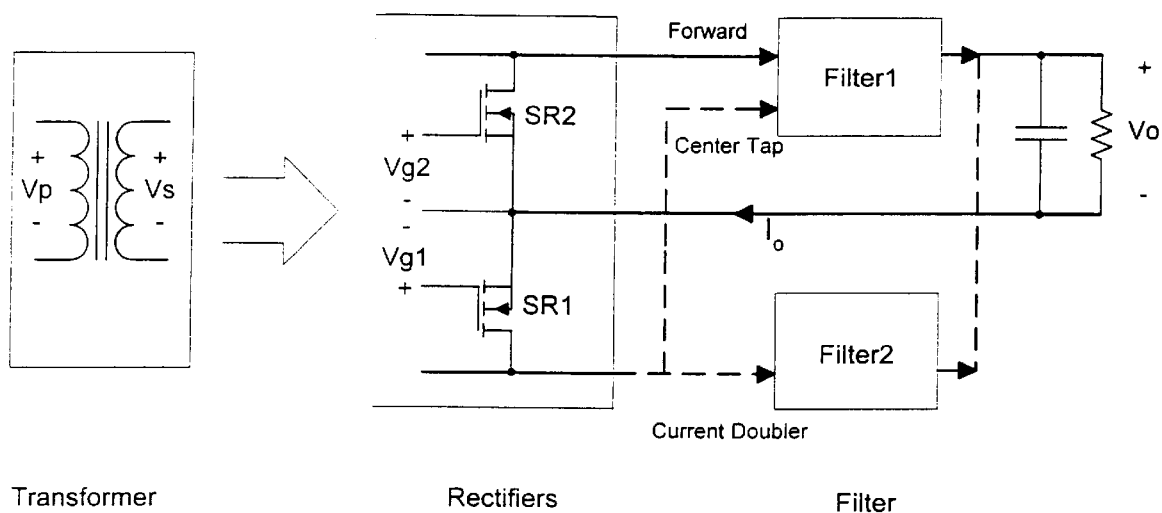
FIG. 4A is a schematic diagram of synchronous rectification on the secondary side of a power transformer.
Figure 4B:
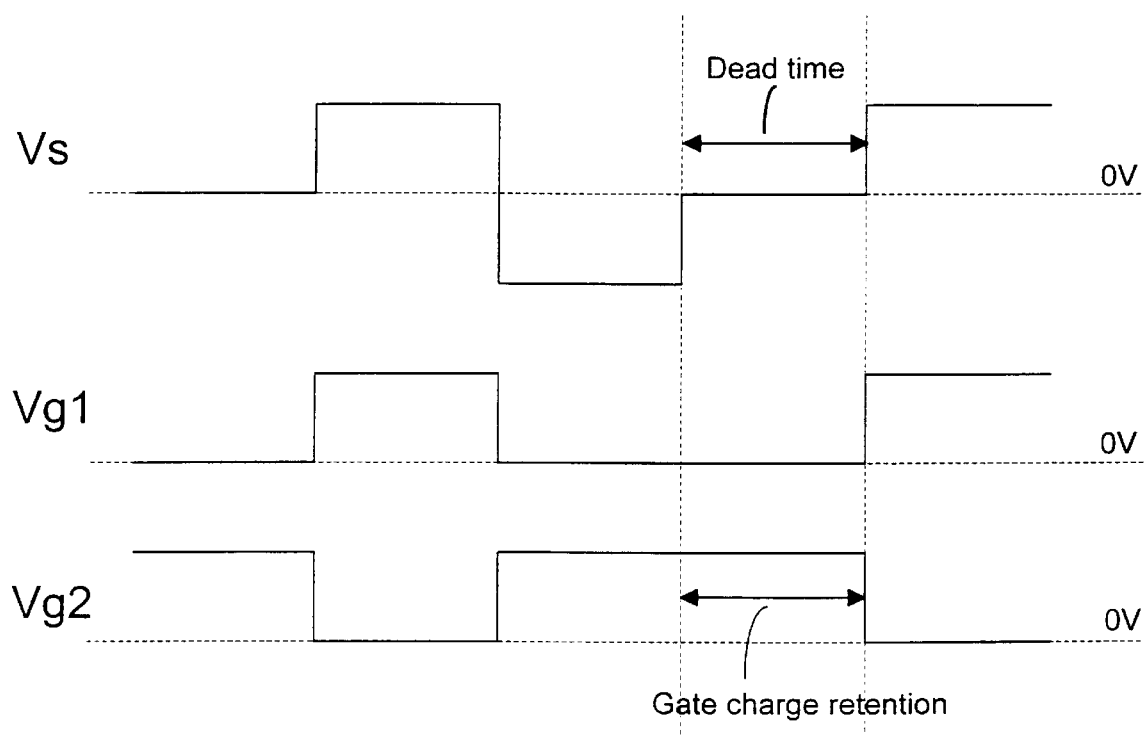
FIG. 4B shows waveforms for the schematic diagram in FIG. 4A.

The present invention applies this principle to power converters having synchronous rectifiers. FIG. 4A shows a schematic diagram of synchronous rectification on the secondary side of a power transformer. Voltage output from the transformer secondary side is rectified by synchronous recifiers and then filtered to produce a DC voltage. Different arrangements of the filters can produce a forward converter, a center tapped converter or a current doubler converter. Regardless of the converter type, the synchronous rectifiers need similar driving signals. When secondary voltage Vs is positive, synchronous rectifier SR1 has to be turned on while synchronous rectifier SR2 has to be turned off, and vice versa for negative secondary voltage Vs. Such driving signals can be derived from secondary voltage Vs. When the secondary voltage Vs is zero during dead time, one of the synchronous rectifiers should be turned on in order to avoid body diode conduction. The principle of gate charge retention is applied to synchronous rectifier SR2 so it remains turned on in the dead time period. This avoids body diode conduction and excessive dissipation.

Figure 5A:
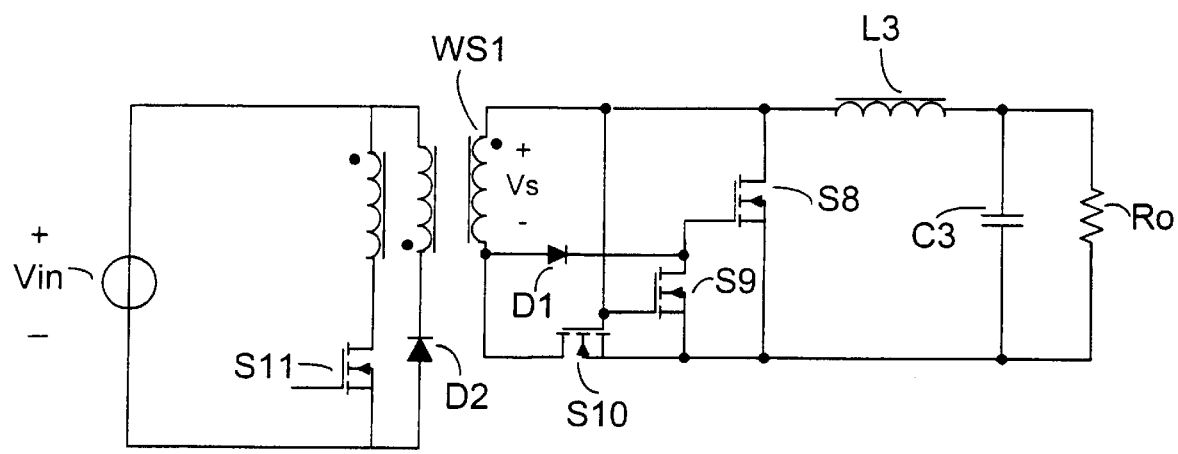
FIG. 5A is a schematic diagram of the first embodiment of the present invention.

A first embodiment of the present invention is shown in FIG. 5A. It comprises input terminals for a DC source. It further comprises a switching apparatus with a transformer having at least a secondary winding WS1. In FIG. 5A a single switch forward converter is shown, however, it is emphasized that any forward or flyback topology, which can produce an appropriate alternating voltage waveform at its secondary output winding, can be applied to the present invention. A first terminal of the transformer secondary winding is attached to the drain terminal of a MOSFET switch S8. The gate terminal of MOSFET switch S8 is coupled to the cathode of a diode D1. The anode of diode D1 is connected to a second terminal of the transformer secondary winding. A second MOSFET switch S9 has its drain terminal attached to the gate terminal of MOSFET switch S8, its source terminal connected to that of MOSFET switch S8, and its gate terminal attached to the gate terminal of a third MOSFET switch S10. This node joining the gate terminals of MOSFETs S9 and S10 is attached to the first terminal of the transformer secondary winding. MOSFET switch S10 has its drain terminal attached to the second terminal of the transformer secondary winding. A low pass filter with inductor L3 and capacitor C3 is coupled to the first terminal of the transformer secondary winding and the node joining the source terminals of MOSFETs S8, S9 and S10. Two output terminals are attached to capacitor C3 for attachment to a load Ro.

Figure 5B:
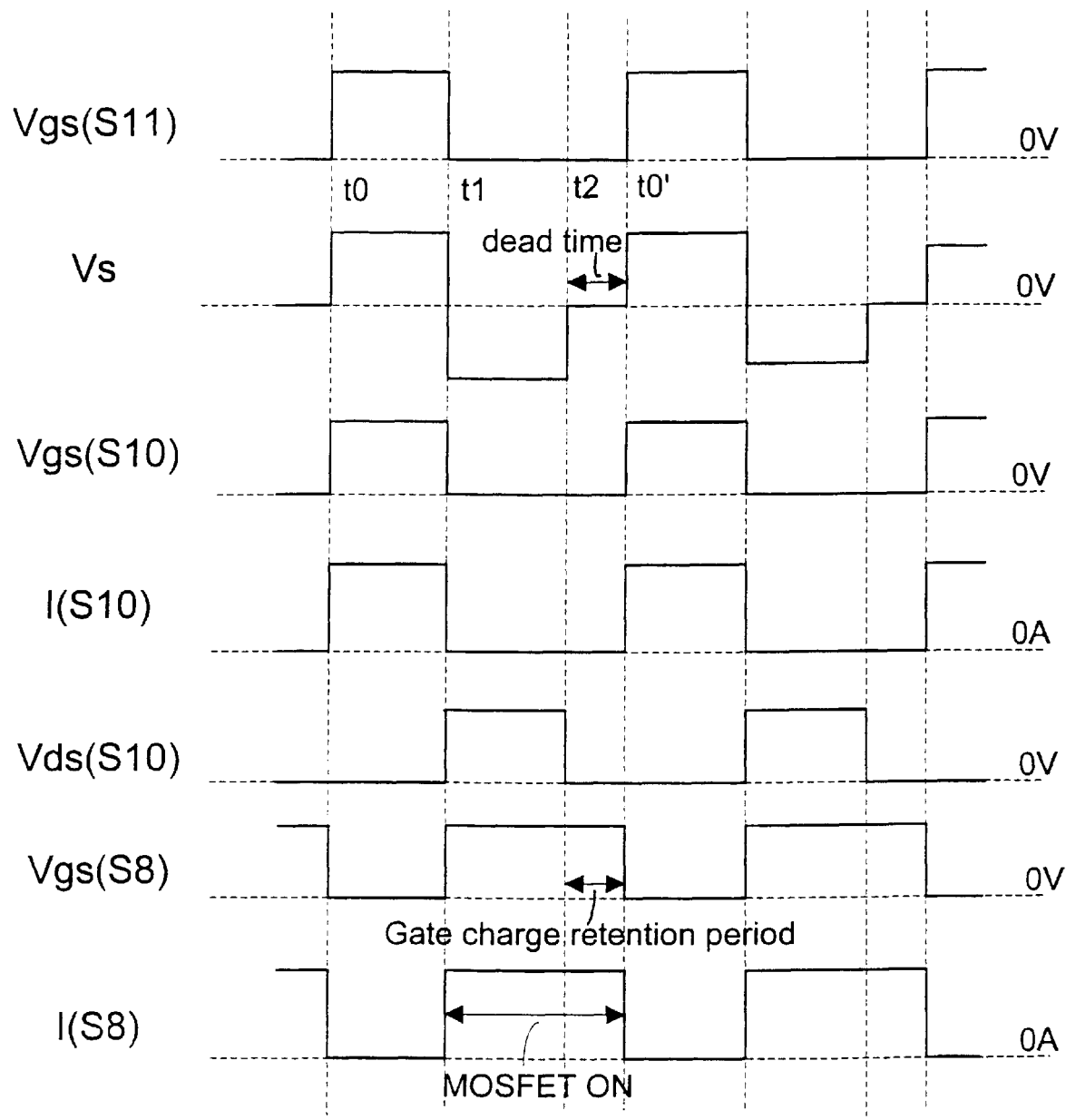
FIG. 5B shows waveforms for the first embodiment of the present invention.

The operation of this synchronous rectifier can be explained in terms of the waveforms shown in FIG. 5B.

In the time period t0 to t1, primary switch S11 is turned on. Input voltage Vin is applied to the transformer primary winding. A corresponding voltage is induced on the secondary winding WS1, MOSFET switches S9 and S10 are turned on. Load current goes through MOSFET S10 while MOSFET S8 is turned off by MOSFET S9.

In the time period t1 to t2, primary switch S11 is turned off. Magnetizing current goes through a reset winding of the transformer and a reset diode D2. On the secondary side, voltage induced changes sign and turns off MOSFETs S9 and S10. At the same time MOSFET S8 is turned on. Now S8 is on and output current freewheels through it. The time duration of this mode depends on the fall of transformer magnetizing current.

In the time period t2 to t0' when transformer has reset, zero voltage appear across the transformer secondary. However, MOSFET S8 remains on because gate charged acquired in the previous period is retained. Load current is able to continue to freewheel through the low loss MOSFET S8 rather than its body diode. This solves the problem of conduction through body diode during dead time. Charge storage in MOSFET S8 is discharged only when MOSFET S9 is turned on at the beginning of next cycle. In this embodiment, switch S10 is a first synchronous switch, switch S9 is a state release switch, switch S8 is a second synchronous switch, and diode D1 is a state retention device.

There is an overall saving in component cost compared to active clamp method. Compared to prior art self-driven synchronous rectifier, the present invention needs two more devices S9 and D1 on the secondary side. Despite this, only low power components are required since they do not carry load current. By this arrangement the present invention eliminates active clamp circuit on the primary side. This brings about saving of at least one power switch and its associated circuitry.

In general, gate charge of MOSFET devices can be retained sufficiently long for dead time period. One can estimate the time that the gate voltage can be kept above threshold voltage in the present invention. There are three discharging paths for gate charge. Namely, through diode D1, MOSFET S9, and the gate to source resistance of synchronous MOSFET S8. A typical Synchronous MOSFET has total gate charge of around 60 nc. Typical gate to source leakage current is about 100 nA. Drain to source leakage current is about 100 mA. Diode reverse leakage current is 1 mA for schottky diode in the worst case, although diode with much less leakage than schottky diode is used for diode D1. Assume that typical gate threshold voltage is 2V and initial gate voltage is 5V. Gate voltage remains above threshold voltage for around 33 ms. Compared this period with the dead time period at switching frequencies higher than 100 kHz in most applications, which is less than 10 ms, one can say that this time period is long enough to sustain conduction of the synchronous rectifier during dead time.

In practical design, transformer always has leakage inductance. This leakage inductance and other parasitic inductance such as device lead inductance and PCB layout inductance create a transition period for secondary current winding to build up from zero to load current or to decrease from load current to zero. During this transition period, secondary voltage falls on the leakage inductance instead of gate source terminals of synchronous MOSFETs because of current commutation. Thus output current goes through body diode of synchronous MOSFETs. Body diode turn on address high conduction loss and serious reverse recovery problems, which greatly degrade synchronous rectification performance. It should be noted that leakage inductance may cause body diode conduction in almost all topologies if the synchronous rectifiers are not properly driven. The two synchronous rectifiers may also conduct simultaneously and cause overcurrent in the secondary side if there is delay in turning off of these devices.

Figure 6A:
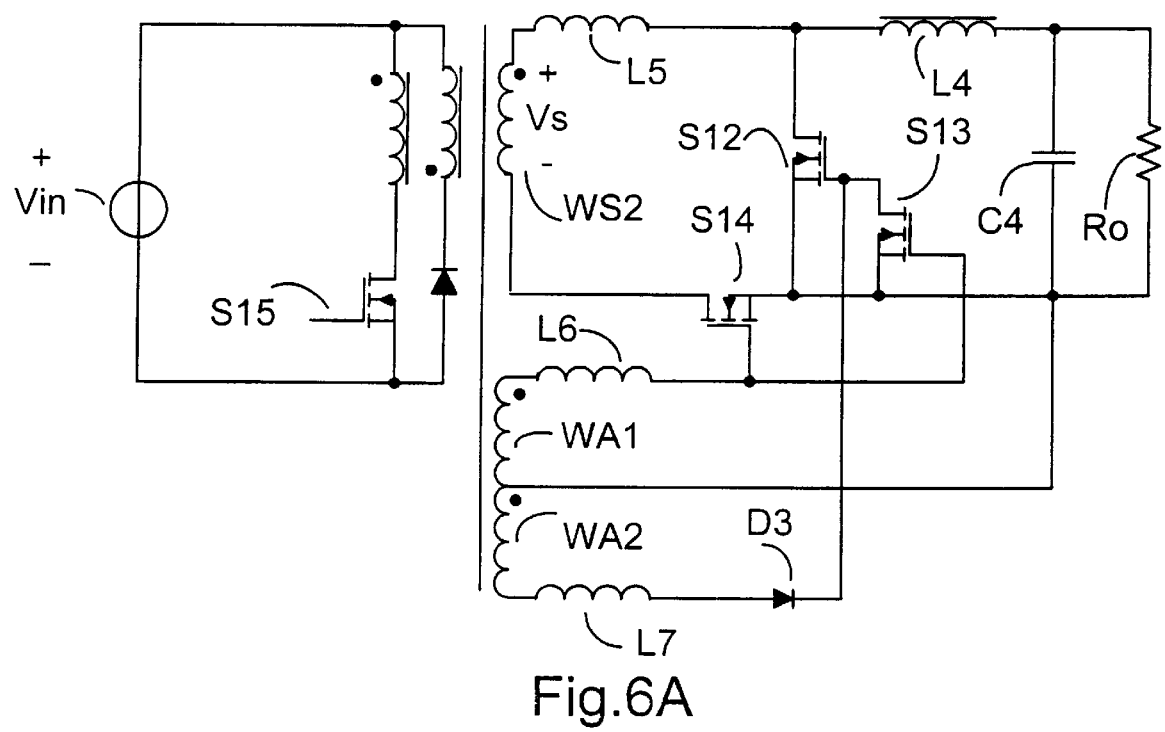
FIG. 6A is a schematic diagram of the second embodiment of the present invention.

In order to solve the problem of leakage inductance and delay, a second embodiment of the present invention, which comprises of auxiliary windings is presented. A schematic diagram of this embodiment is shown in FIG. 6A. It comprises of input terminals for a DC source. It further comprises of switching apparatus with a transformer having at least a secondary winding and two auxiliary windings. In FIG. 6A a single switch forward converter is shown, however, it is emphasized that any forward topology, which can produce an appropriate alternating voltage waveform at its secondary output winding can be applied to the present invention. A first terminal of the transformer secondary winding with embedded leakage inductance is attached to the drain terminal of a MOSFET switch S12. A second MOSFET switch S13 has its drain terminal attached to the gate terminal of MOSFET switch S12, its source terminal connected to that of MOSFET switch S12, and its gate terminal attached to the gate terminal of a third MOSFET switch S14. This MOSFET S14 has its source tied to a node joining the source terminals of MOSFETs S12 and S13. This MOSFET S14 has its drain terminal connected to a second terminal of the transformer secondary winding. The transformer has two auxiliary windings. A first auxiliary winding WA1 with embedded leakage inductance has one of its two terminals attached to a node joining the gate terminals of MOSFETs S13 and S14. Another terminal of winding WA1 is tied to a node joining the source terminals of MOSFETs S12, S13 and S14. This node is also tied to a terminal of a second auxiliary winding WA2. A diode D3 has its anode coupled to a second terminal of winding WA2, and its cathode attached to a node joining the gate terminal of MOSFET S12 and the drain terminal of MOSFET S13. A low pass filter with inductor L4 and capacitor C4 is coupled to the drain of MOSFET S12 and a node joining the source terminals of MOSFETs S12, S13 and S14. Two output terminals are attached to output capacitor C4 for attachment to a load.

Figure 6B:
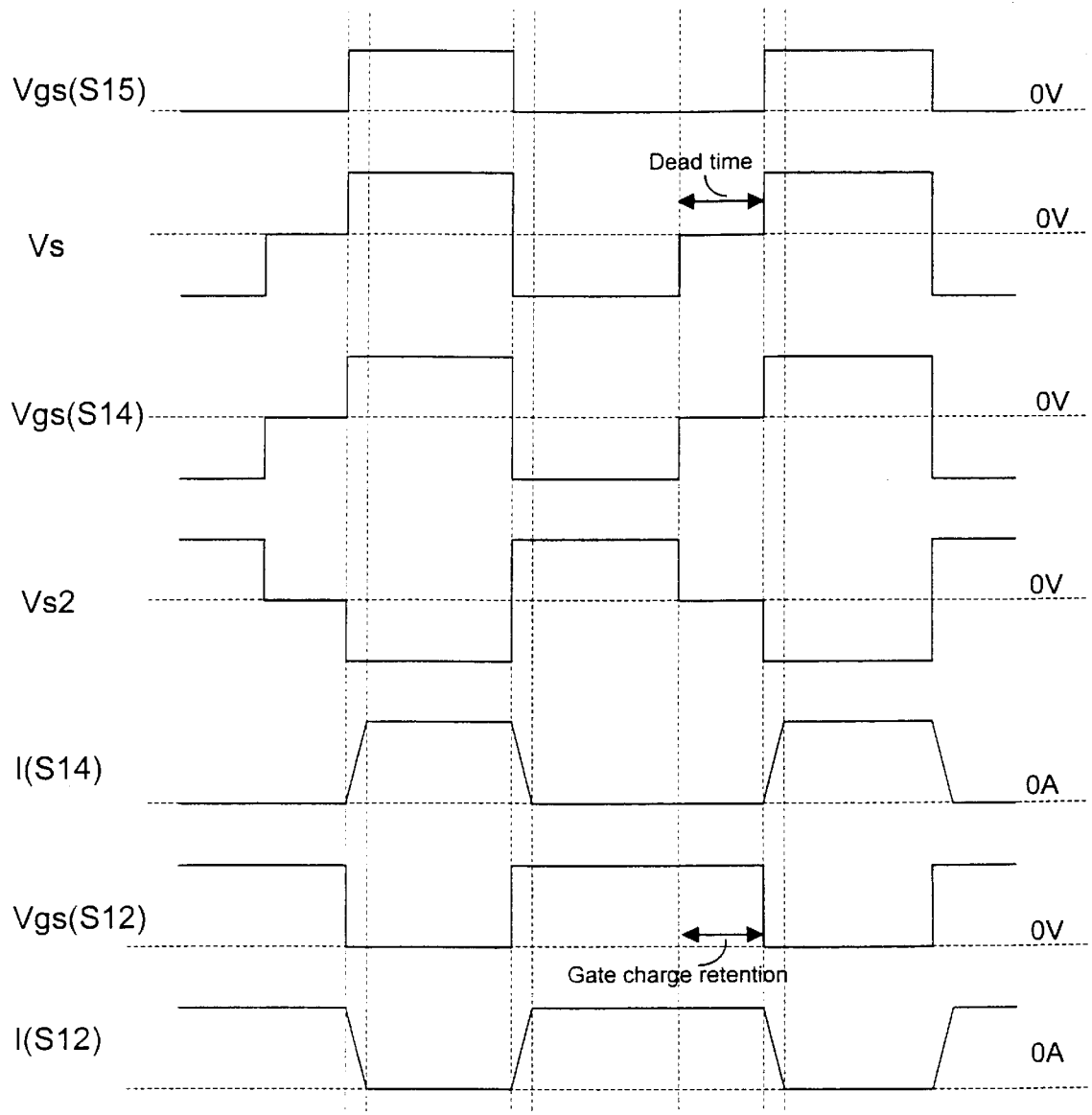
FIG. 6B shows waveforms for the second embodiment of the present invention.

Waveforms associated with the second embodiment are shown in FIG. 6B. The operation of this embodiment is very similar to that of the aforementioned first embodiment. When primary switch S15 is on, input DC voltage is applied to primary winding of the transformer. Auxiliary winding WA1 reflected voltage turns on switch S14 and S13. So S12 is turned off. Because of the existence of secondary leakage inductance L5, voltage of secondary winding first falls on the leakage inductance. Current flowing through S14 builds up linearly until it picks up output current. When MOSFET S15 is off, magnetic reset period begins. Auxiliary winding WA1 reflected voltage turns off MOSFETs S14 and S13 while WA2 voltage charges the gate capacitance of MOSFET S12 through diode D3. Again there is a current transition period during, which output current commutes from MOSFET S14 to S12. Because MOSFET S13 remains off until the next switching cycle, even if magnetic reset period is over and transformer winding voltage is zero, the gate voltage of MOSFET S12 is still high because of gate charge retention. This provides output current a low impedance path, which keeps the merit of synchronous rectifier. Synchronous MOSFETs S12 and S14 are driven by auxiliary windings WA1 and WA2. Even if the auxiliary windings have similar amount of leakage inductance they carry much lower current than the load current. Hence the transition time is much shorter. Also time delay so caused is reduced and turn on and turn off signals depend solely on reflected signal from the primary side and thus eliminate the problem of simultaneous conduction and overcurrent.

Figure 7A:
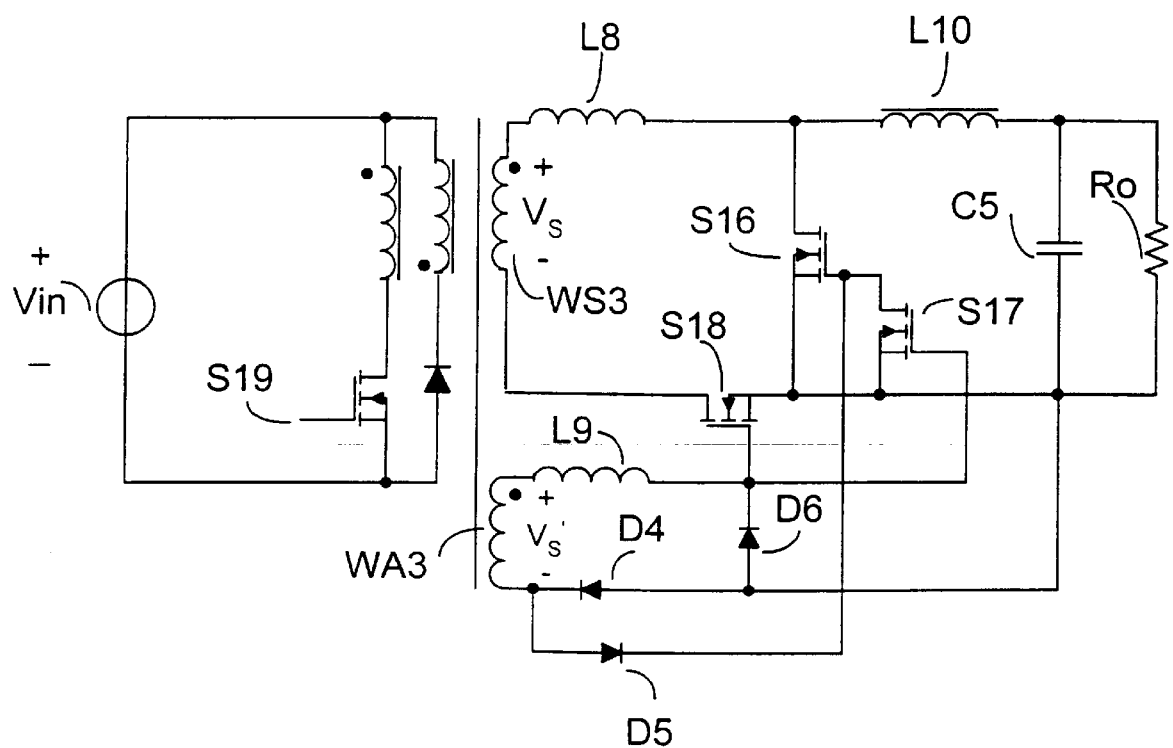
FIG. 7A is a schematic diagram of the third embodiment of the present invention.

The number of auxiliary winding is not restricted to two, a third embodiment of the present invention is shown in FIG. 7A, which has only one auxiliary winding to drive two synchronous rectifiers. This embodiment comprises of input terminals for a DC source. It further comprises of switching apparatus with a transformer having at least a secondary winding and one auxiliary winding. In FIG. 7A a single switch forward converter is shown, however, it is emphasized that any forward topology, which can produce an appropriate alternating voltage waveform at its secondary output winding can be applied to the present invention. A first terminal of the transformer secondary winding with embedded leakage inductance is attached to the drain terminal of a MOSFET switch S16. A second MOSFET switch S17 has its drain terminal attached to the gate terminal of MOSFET switch S16, its source terminal connected to that of MOSFET switch S16, and its gate terminal attached to that of a third MOSFET switch S18. This MOSFET S18 has its source tied to a node joining the source terminals of MOSFETs S16 and S17. This MOSFET S18 also has its drain terminal connected to a second terminal of the transformer secondary winding WS3. The transformer has an auxiliary winding WA3. Its embedded leakage inductance L9 is also shown in FIG. 7A. Auxiliary winding WA3 has one of its two terminals attached to a node joining the gate terminals of MOSFETs S17 and S18. Another terminal of winding WA3 is tied to a node joining the cathode of a diode D4 and the anode of another diode D5. Diode D4 has its anode connected to a node joining the source terminals of MOSFETs S16, S17 and S18. Diode D5 has its cathode connected to the gate terminal of MOSFET S16. Another diode D6 has its anode connected to the anode of diode D4, and its cathode connected the gate terminal of MOSFET S18. A low pass filter with inductor L10 and capacitor C5 is coupled to the drain of MOSFET SI6 and a node joining the source terminals of MOSFETs S16, S17 and S18. Two output terminals are attached to output capacitor C5 for attachment to a load.

Figure 7B:
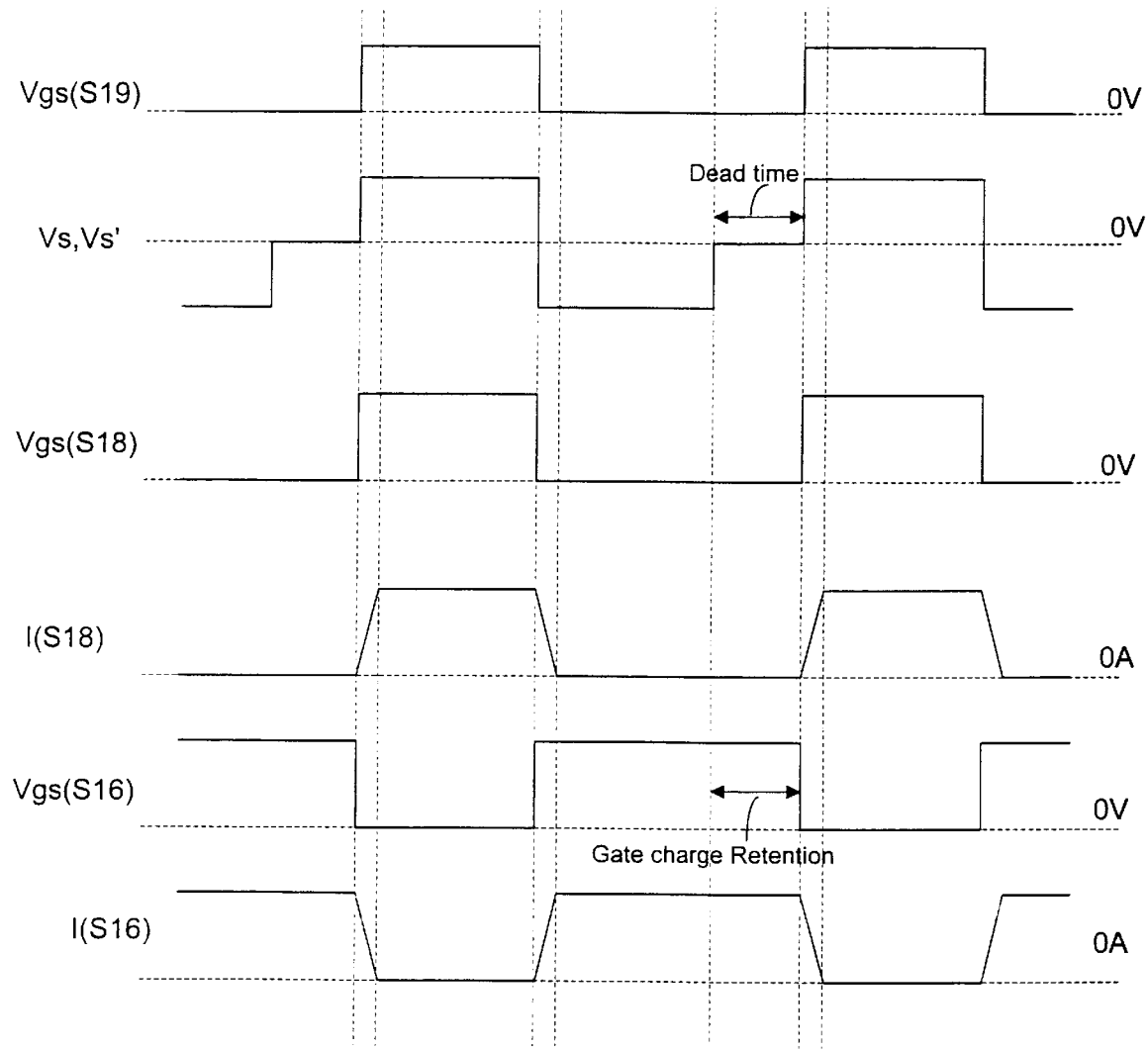
FIG. 7B shows waveforms for the third embodiment of the present invention.

Waveforms associated with the third embodiment are shown in FIG. 7B. The number of auxiliary windings is reduced to one at the expenses of two extra diodes. When primary switch S19 is on, input DC voltage is applied to primary winding of the transformer. Reflected voltage of auxiliary winding WA3 turns on MOSFETs S18 and S17 with charging path through diode D4. So MOSFET S16 is turned off. Because of the existence of secondary leakage inductance L8, voltage of secondary winding first falls on the leakage inductance. Current flowing though MOSFET S18 increases linearly until it picks up output current. When MOSFET S19 is off, magnetic reset period begins. Reflected voltage of auxiliary winding WA3 changes it polarity. Diode D5 and MOSFET S17 provide a discharging path for gate charge in S18 and S17. It should be noted that MOSFET S17 is part of the discharging path for its own gate charge. Ideally all gate charge should be removed before the switches are completely turned off. However in case when MOSFET S17 turns off before the gate charge is completely removed, voltage induced in auxiliary winding WA3 continues to discharge the gate source capacitance and charge up the capacitances across MOSFET S17. This effect is enhanced in the presence of a leakage inductance L9 and diode D6. Leakage inductance L9 forms a resonance circuit with capacitances in the conducting path and improves charge exchange between the gate source capacitance and those across MOSFET S17. Diode D6 clamps the gate source of MOSFET S18 to ensure that the voltage does not go excessively negative. Again there is a current transition period during, which output current commutes from MOSFET S18 to MOSFET S16. Because MOSFET S17 remains off until the next switch cycle, even if magnetic reset period is over and transformer winding voltage is zero, the gate voltage of MOSFET S16 is still high because of gate charge retention. This provides output current a low impedance path, which keeps the merit of synchronous rectifier.

It is to be appreciated that the number of auxiliary winding used for driving in alternative arrangement can be one or two, and this is applicable to all following embodiments with auxiliary winding. It is preferable to adopt single auxiliary winding embodiments because in these embodiments the driving loss of MOSFET S16 and S18 is lower than that in the embodiment with two auxiliary windings as no negative gate drive voltage is allowed. The gate voltage of MOSFETs S17 and S18 is clamped by diode D6, while the gate voltage of MOSFET S16 is clamped by diodes D4 and D5.

It is also to be appreciated that diode D6 may be removed without impairing the gate charge retention function. However negative gate voltage exists in S18 and driving loss is higher.

Figure 8A:
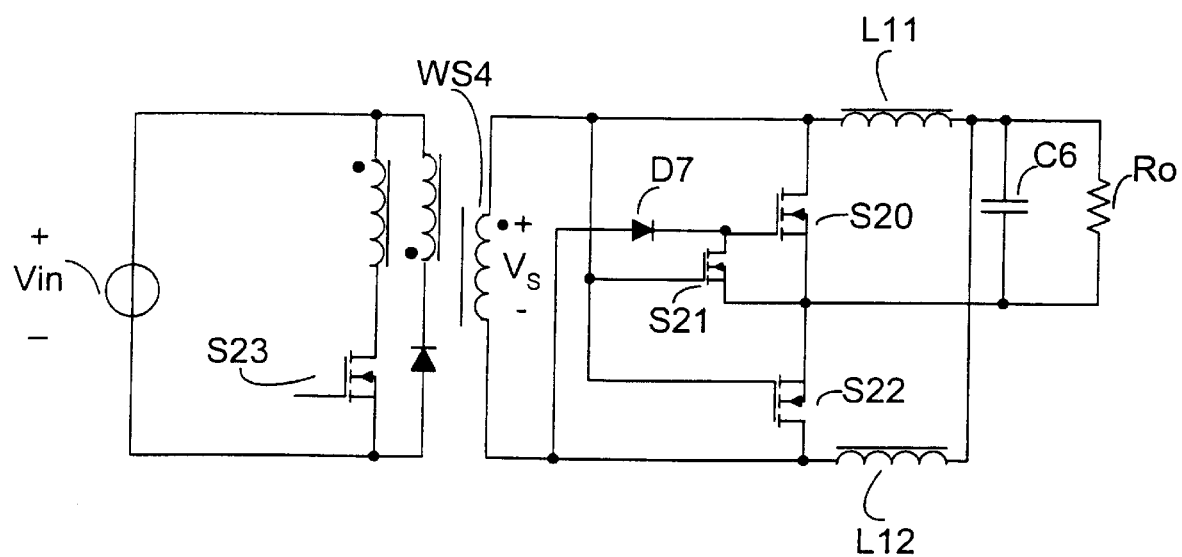
FIG. 8A is a schematic diagram of the forth embodiment of the present invention.

A forth embodiment of the present invention is shown in FIG. 8A. It is a single ended current doubler converter with synchronous rectifiers driven by transformer secondary winding. This embodiment comprises of input terminals for a DC source. It further comprises of switching apparatus with a transformer having at least a secondary winding WS4. In FIG. 8A a single switch forward converter is shown, however, it is emphasized that any forward topology, which can produce an appropriate alternating voltage waveform at its secondary output winding can be applied to the present invention. A first terminal of the transformer secondary winding is attached to the drain terminal of a MOSFET switch S20. A second MOSFET switch S21 has its drain terminal attached to the gate terminal of MOSFET switch S20, its source terminal connected to that of MOSFET switch S20, and its gate terminal attached to the gate terminal of a third MOSFET switch S22. This MOSFET S22 has its source tied to a node joining the source terminals of MOSFETs S20 and S21. MOSFET S22 also has its drain terminal connected to a second terminal of the transformer secondary winding. A diode D7 has its anode connected to the second terminal of the transformer secondary winding and its cathode connect to the gate terminal of MOSFET S20. An inductor L11 is connected between the drain terminal of MOSFET S20 and a node joining another inductor L12, which is in turn connected to the drain terminal of MOSFET S22. An output capacitor C6 is connected between the node joining inductors L11 and L12 and the node joining the source terminals of MOSFETs S20, S21 and S22. Two output terminals are attached to output capacitor C6 for attachment to a load.

Figure 8B:
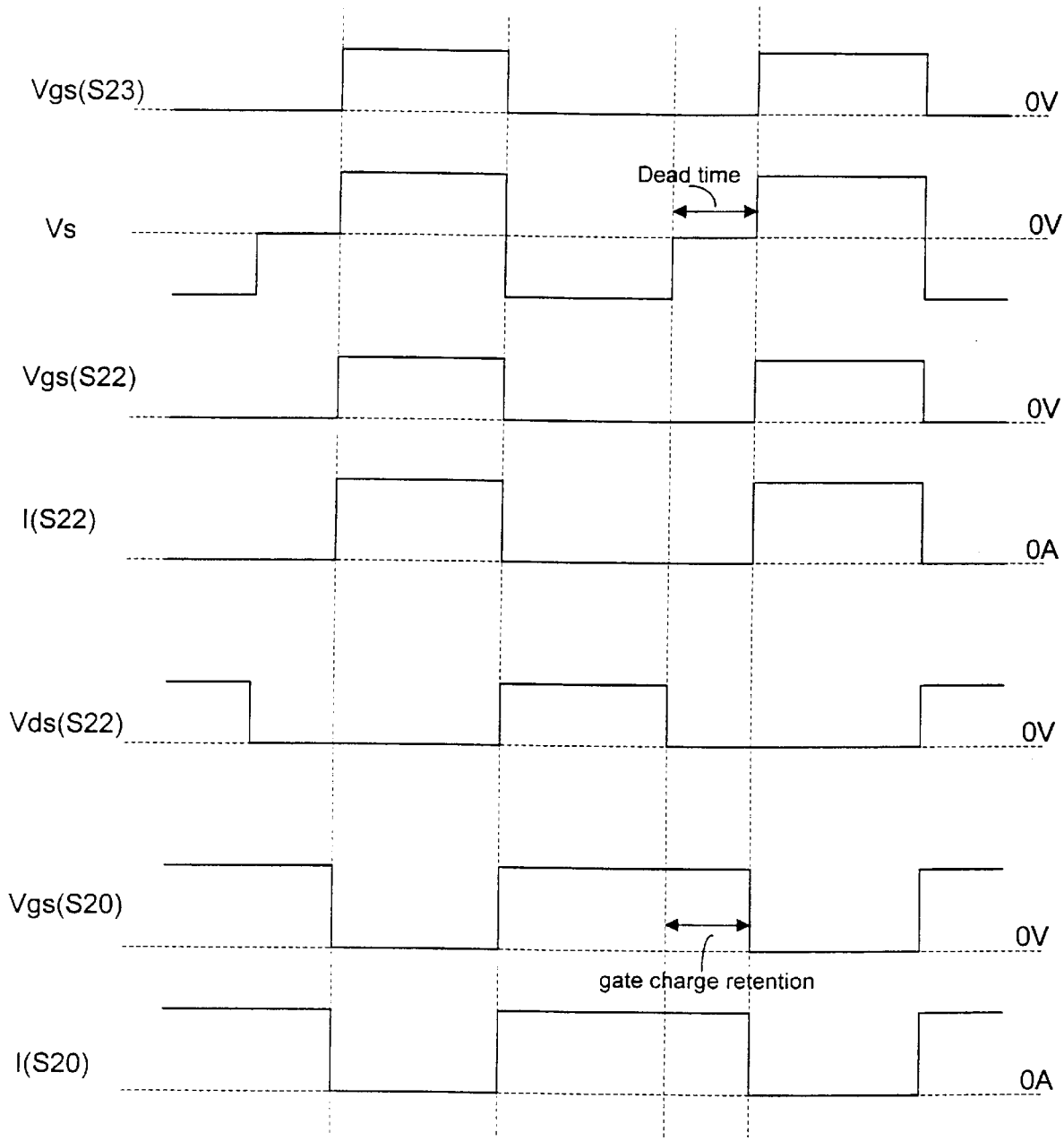
FIG. 8B shows waveforms for the forth embodiment of the present invention.

Waveforms associated with the forth embodiment are shown in FIG. 8B. This embodiment is a single ended current doubler converter. In a first time period when voltage across secondary winding WS4 is positive, energy is transferred to output by forward mode. In the time period that follows, when primary switch S23 is turned off, energy is transferred to the output by flyback mode. Current on secondary side is handled by MOSFETs S22 and S20 in the two time periods respectively. Towards the end of a switching cycle voltage across secondary winding has diminishes to zero. MOSFET S20 is kept conducting by the charge retention principle. Low conduction lost is maintained throughout the cycle. When primary switch S23 is on, input DC voltage is applied to primary winding of the transformer. On the secondary side, MOSFETs S21 and S22 are turned on by the secondary winding WS4 reflected voltage. MOSFET S20 is turned off. Output current commutes from MOSFET S20 to MOSFET S22. When MOSFET S23 is off, magnetic reset period begins. Secondary reflected voltage turns off MOSFETs S21 and S22 while charges the gate capacitance of MOSFET S20 through diode D7. Because S21 remains off until the next switch cycle, even if magnetic reset period is over and transformer winding voltage is zero, the gate voltage of MOSFET S20 is still high because of gate charge retention. This provides output current a low impedance path, which keeps the merit of synchronous rectifier.

Figure 9A:
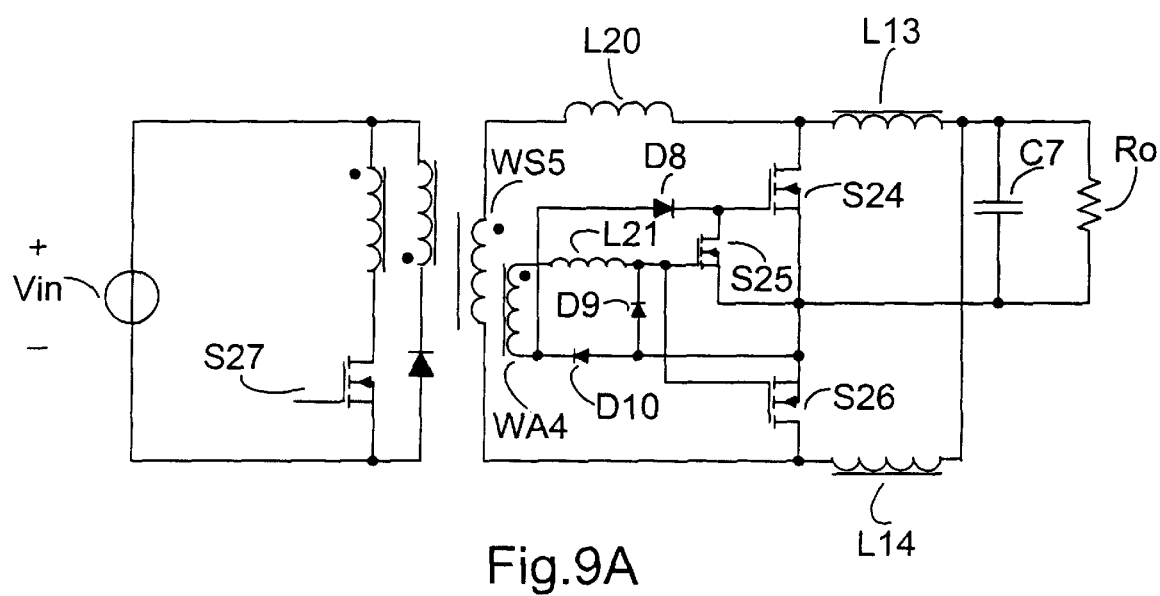
FIG. 9A is a schematic diagram of the fifth embodiment of the present invention.

A fifth embodiment of the present invention is shown in FIG. 9A. It is another current doubler converter with synchronous rectifiers driven by an auxiliary winding. This embodiment comprises of input terminals for a DC source. It further comprises of switching apparatus with a transformer having at least a secondary winding WS5 and an auxiliary winding WA4. In FIG. 9A a single switch forward converter is shown, however, it is emphasized that any forward topology, which can produce an appropriate alternating voltage waveform at its secondary output winding can be applied to the present invention. A first terminal of the transformer secondary winding with embedded leakage inductance is attached to the drain terminal of a MOSFET switch S24. A second MOSFET switch S25 has its drain terminal attached to the gate terminal of MOSFET switch S24, its source terminal connected to that of MOSFET switch S24, and its gate terminal attached to that of a third MOSFET switch S26. This MOSFET S26 has its source tied to a node joining the source terminals of MOSFETs S24 and S25. MOSFET S26 also has its drain terminal connected to a second terminal of the transformer secondary winding. An auxiliary winding WA4 has one of its terminals with embedded leakage inductance attached to a node joining the gates of MOSFETs S25 and S26, and another terminal attached to the anode of a diode D8 and the cathode of diode D10. Diode D8 has its cathode attached to the gate terminal of MOSFET S24 and diode D10 has its anode connected to node joining the source terminals of MOSFETs S24, S25 and S26. Another diode D9 is connected between the gate and source terminals of MOSFET S25. An inductor L13 is connected between the drain terminal of MOSFET S24 and a node joining another inductor L14, which is in turn connected to the drain terminal of MOSFET S26. An output capacitor C7 is connected between the node joining inductors L13 and L14 and the node joining the source terminals of MOSFETs S24, S25 and S26. Two output terminals are attached to output capacitor C7 for attachment to a load.

Figure 9B:
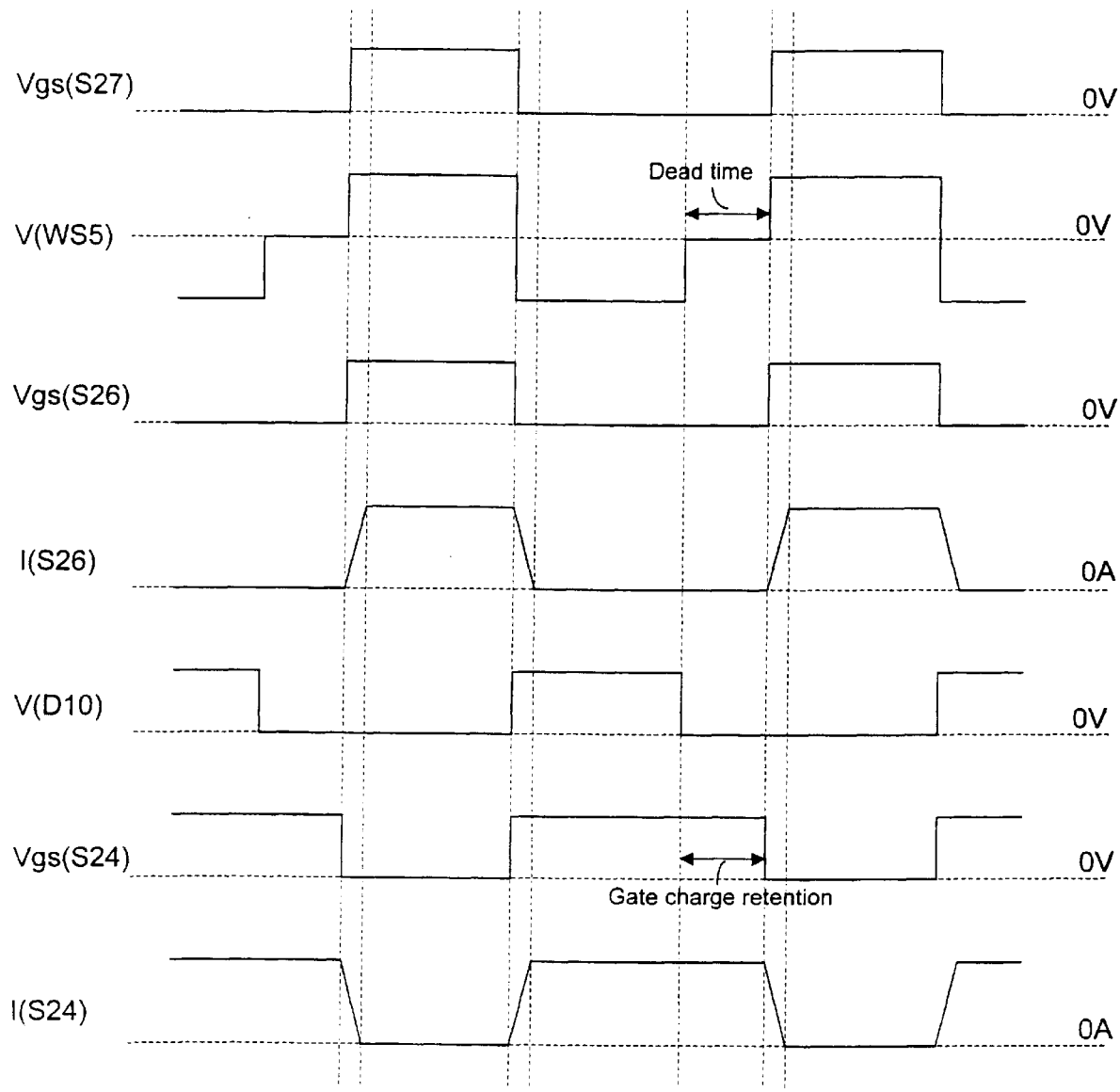
FIG. 9B shows waveforms for the fifth embodiment of the present invention.

Waveforms associated with the fifth embodiment are shown in FIG. 9B. This embodiment is also a single ended current doubler converter similar to the forth embodiment. Synchronous MOSFETs in this embodiment are driven by a separate auxiliary winding instead of transformer secondary winding. This method avoids the aforementioned effect of leakage inductance and reduce time delay. When primary switch S27 is on, input DC voltage is applied to primary winding of the transformer. The reflected voltage of auxiliary winding WA4 turns on MOSFETs S25 and S26 with charging path through diode D10. So MOSFET S24 is turned off. Because of the existence of secondary leakage inductance L20, reflected voltage of secondary winding falls first on the leakage inductance. Current flowing though MOSFET S26 increases linearly until it picks up output current. When MOSFET S27 is off, magnetic reset period begins. Reflected voltage of auxiliary winding WA4 changes it polarity. Diode D8 and MOSFET S25 provide a discharging path for gate charge in S25 and S26. It should be noted that MOSFET S25 is part of the discharging path for its own gate charge. Ideally all gate charge should be removed before the switches are completely turned off. However in case when MOSFET S25 turns off before the gate charge is completely removed, voltage induced in auxiliary winding WA4 continues to discharge the gate source capacitance and charge up the capacitances across MOSFET S25. This effect is enhanced in the presence of leakage inductance L21 and diode D9. Leakage inductance L21 forms a resonance circuit with capacitances in the conducting path and improves charge exchange between the gate source capacitance and those across MOSFET S25. Diode D9 clamps the gate source of MOSFET S25 to ensure that the voltage does not go excessively negative. Again there is a current transition period during, which output current commutes from MOSFET S26 to MOSFET S24. Because MOSFET S25 remains off until the next switch cycle, even if magnetic reset period is over and transformer winding voltage is zero, the gate voltage of MOSFET S24 is still high because of gate charge retention. This provides output current a low impedance path, which keeps the merit of synchronous rectifier.

It is to be appreciated that diode D9 may be removed without impairing the gate charge retention function. However negative gate voltage exists in S25 and driving loss is higher.

Figure 10A:
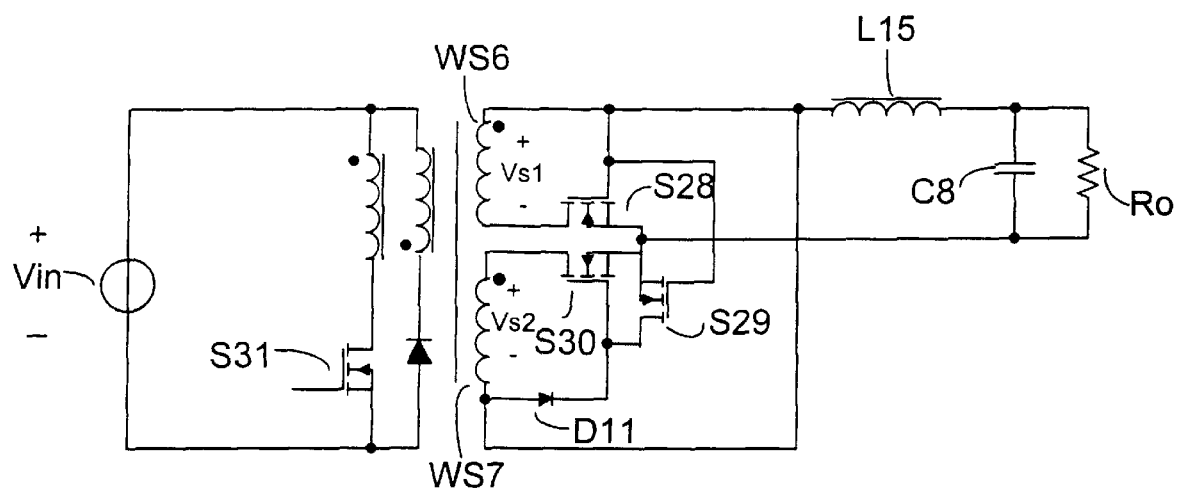
FIG. 10A is a schematic diagram of the sixth embodiment of the present invention.

A sixth embodiment of the present invention is shown in FIG. 10A. It is a center tapped converter with synchronous rectifiers operated on the principle of the present invention. This embodiment comprises of input terminals for a DC source. It further comprises of switching apparatus with a transformer having at least two secondary windings WS6 and WS7. In FIG. 10A a single switch forward converter is shown, however, it is emphasized that any forward topology, which can produce an appropriate alternating voltage waveform at its secondary output winding can be applied to the present invention. A first terminal of transformer secondary winding WS6 is attached to the drain terminal of a MOSFET switch S28. The gate terminal of MOSFET S28 is attached to a second terminal of secondary winding WS6. The source terminal of MOSFET S28 is attached to the source terminal of a second MOSFET S29. MOSFET S29 has its gate terminal attached to that of MOSFET S28, and its drain terminal attached to the gate terminal of a third MOSFET S30. MOSFET S30 has its drain terminal attached to a first terminal of secondary winding WS7 and its source terminal attached to those of MOSFETs S28 and S29. A diode D11 is coupled between a second terminal of secondary winding WS7 and a node joining the drain terminal of MOSFET S29 and the gate terminal of MOSFET S30. A connection connects up the second terminal of winding WS7 the second terminal of winding WS6. A low pass filter with inductor L15 and capacitor C8 is coupled to the second terminal of winding WS6 and a node joining the source terminals of MOSFETs S28, S29 and S30. Two output terminals are attached to output capacitor C8 for attachment to a load.

Figure 10B:
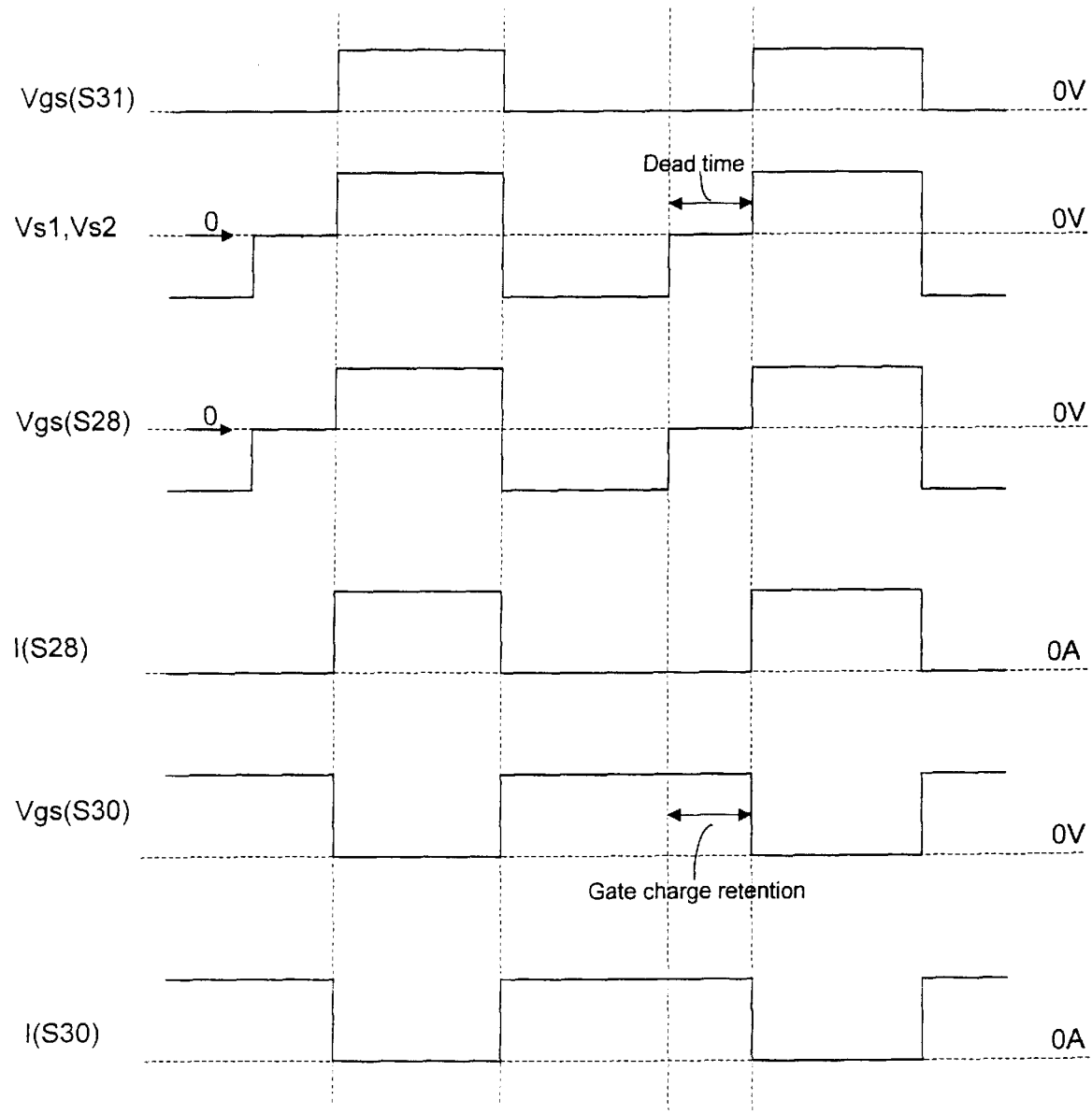
FIG. 10B shows waveforms for the sixth embodiment of the present invention.

Waveforms associated with the sixth embodiment are shown in FIG. 10B. This embodiment is a converter with a tapped secondary, or two secondary windings. In a first time period when voltage across secondary winding WS6 is positive, energy is transferred to output by forward mode. Current is established in inductor L15. In the time period that follows, energy is transferred by flyback mode. At the same time current through inductor L15 contributes to reset of the main transformer. Current on secondary side is handled by MOSFETs S28 and S30. Towards the end of a switching cycle voltage across the secondary windings diminish to zero. MOSFET S30 is kept conducting by the charge retention principle. Low conduction loss is maintained throughout the cycle. When primary switch S31 is on, input DC voltage is applied to primary winding of the transformer. In the secondary side, MOSFETs S28 and S29 are turned on by the reflected voltage of secondary winding WS6. MOSFET S30 is turned off. Output current commutes from MOSFET S30 to S28. When MOSFET S31 is off, magnetic reset period begins. Secondary reflected voltage turns off MOSFETs S28 and S29 while charges the gate capacitance of MOSFET S30 through diode D11. Because MOSFET S29 remains off until the next switch cycle, even if magnetic reset period is over and transformer winding voltage is zero, the gate voltage of MOSFET S30 is still high because of gate charge retention. This provides output current a low impedance path, which keeps the merit of synchronous rectifier.

Figure 11A:
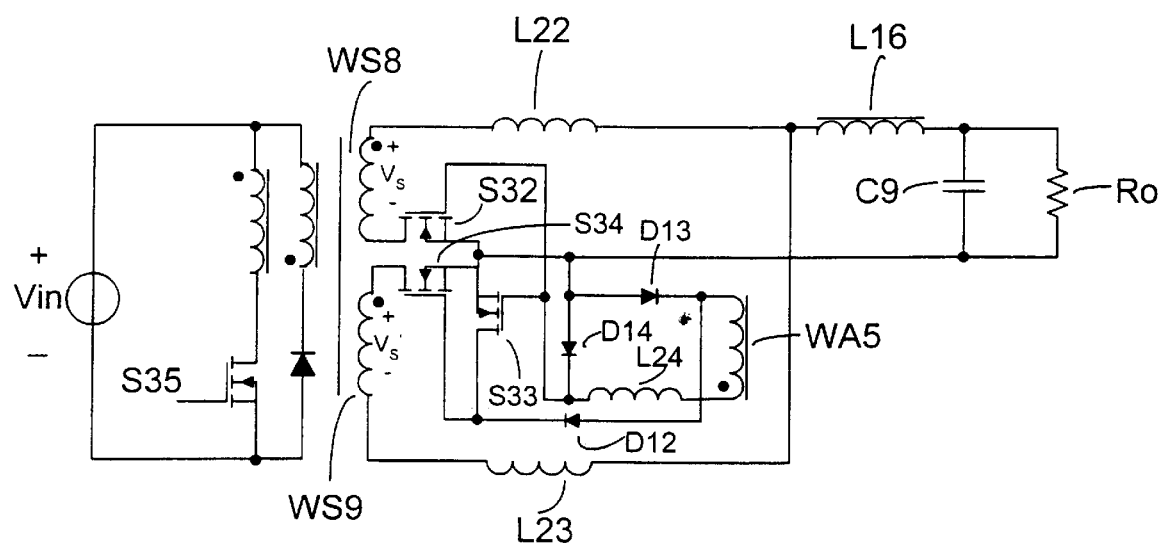
FIG. 11A is a schematic diagram of the seventh embodiment of the present invention.

A seventh embodiment of the present invention is shown in FIG. 11A. It is another center tapped converter with synchronous rectifiers operated on the principle of the present invention with an auxiliary winding. This embodiment comprises of input terminals for a DC source. It further comprises of switching apparatus with a transformer having at least two secondary windings WS8 and WS9, and an auxiliary winding WA5. Each of these windings has its embedded leakage inductance. In FIG. 11A a single switch forward converter is shown, however, it is emphasized that any forward topology, which can produce an appropriate alternating voltage waveform at its secondary output winding can be applied to the present invention. A first terminal of transformer secondary winding WS8 is attached to the drain terminal of a MOSFET switch S32. The gate terminal of MOSFET S32 is attached to that of MOSFET S33. The drain terminal of MOSFET S33 is attached the gate terminal of a third MOSFET S34. MOSFETs S32, S33 and S34 have their source terminals tied together at a node. The drain terminal of MOSFET S34 is attached to a first terminal of a secondary winding WS9. A second terminal of winding WS9 with embedded leakage inductance is connected to a second terminal of winding WS8 with embedded leakage inductance. The transformer has an auxiliary winding WA5. It has one of its terminals attached to the cathode of a first diode D13 and another terminal with embedded leakage inductance attached to the cathode of a second diode D14. The anodes of diodes D13 and D14 are connected to the node joining the source terminals of MOSFETs S32, S33 and S34. A third diode D12 has its anode attached to the cathode of diode D13 and its cathode connected to the gate terminal of MOSFET S34. A low pass filter with inductor L16 and capacitor C9 is coupled to the second terminal of winding WS8 and a node joining the source terminals of MOSFETs S32, S33 and S34. Two output terminals are attached to output capacitor C9 for attachment to a load.

Figure 11B:
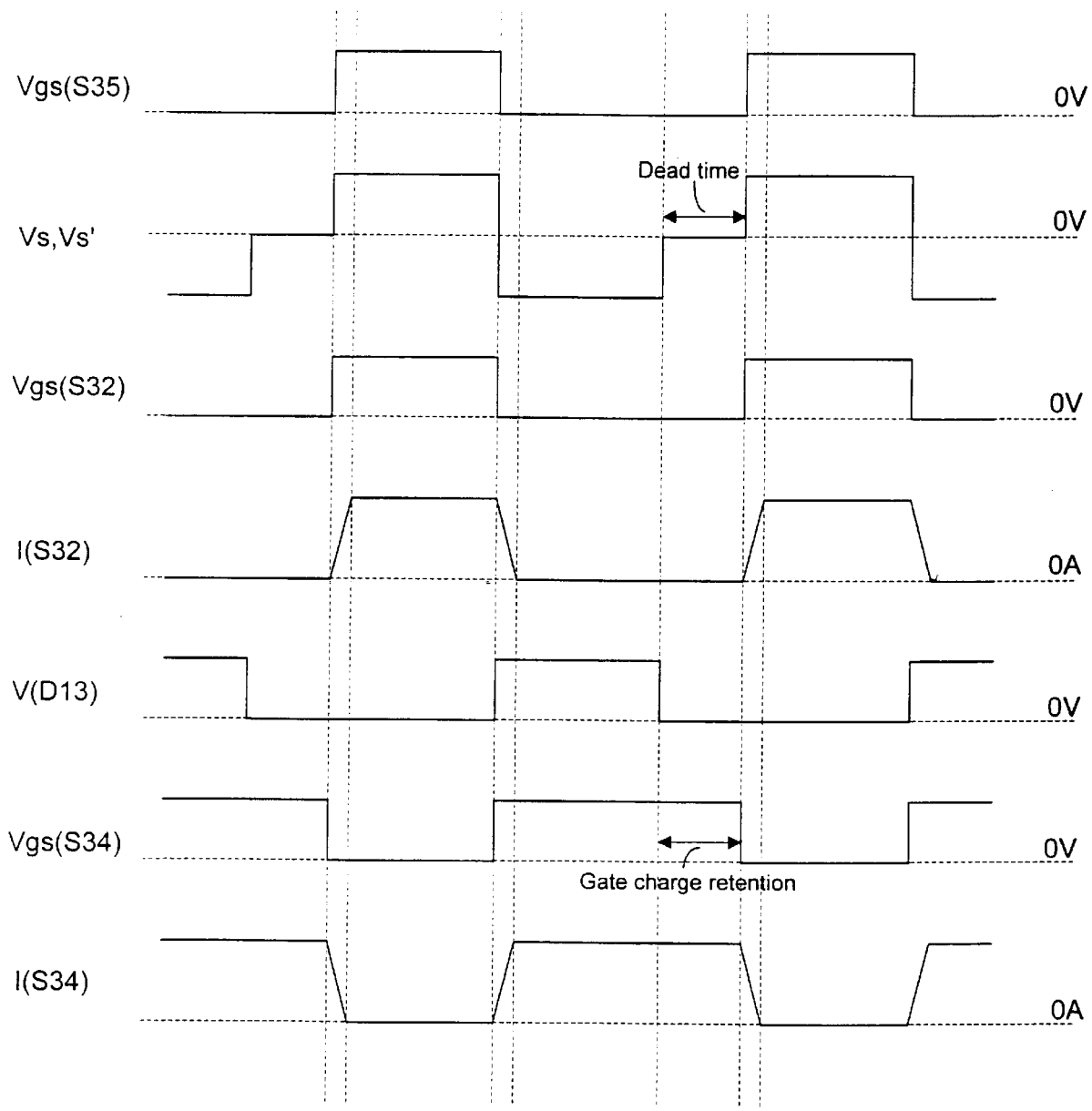
FIG. 11B shows waveforms for the seventh embodiment of the present invention.

Waveforms associated with the seventh embodiment are shown in FIG. 11B. This embodiment operates similar to the sixth embodiment. Synchronous MOSFETs in this embodiment are driven by a separate auxiliary winding instead of transformer secondary winding. This method avoids the aforementioned effect of leakage inductance and reduce time delay. When primary switch MOSFET S35 is on, input DC voltage is applied to primary winding of the transformer. The reflected voltage of auxiliary winding WA5 turns on MOSFETs S32 and S33 with charging path through diode D13. So MOSFET S34 is turned off. Because of the existence of secondary leakage inductance L22 and L23, reflected voltages of secondary windings fall first on the leakage inductance. Current flowing though MOSFET S32 linearly increases until it picks up output current. When MOSFET S35 is off, magnetic reset period begins. Reflected voltage of auxiliary winding WA5 changes it polarity. Diode D12 and MOSFET S33 provide a discharging path for gate charge of S32 and S33. It should be noted that MOSFET S33 is part of the discharging path for its own gate charge. Ideally all gate charge should be removed before the switches are completely turned off. However in case when MOSFET S33 turns off before the gate charge is completely removed, voltage induced in auxiliary winding WA5 continues to discharge the gate source capacitance and charge up the capacitances across MOSFET S25. This effect is enhanced in the presence of leakage inductance L24 and diode D14. Leakage inductance L9 forms a resonance circuit with capacitances in the conducting path and improves charge exchange between the gate source capacitance and those across MOSFET S33. Diode D14 clamps the gate voltage of MOSFET S33 to ensure that the voltage does not go excessively negative. Again there is a current transition period during, which output current commutes from MOSFET S32 to MOSFET S34. Because MOSFET S33 remains off until the next switch cycle, even if magnetic reset period is over and transformer winding voltage is zero, the gate voltage of S34 is still high because of gate charge retention. This provides output current a low impedance path, which keeps the merit of the synchronous rectifier.

It is to be appreciated that diode D14 may be removed without impairing the gate charge retention function. However negative gate voltage exists in S32 and driving loss is higher.

The invention has been described with reference to preferred embodiments. Those skilled in the art will perceive improvements, changes, and modifications. Such improvements, changes, and modification are intended to be covered by the appended claims.

Having described in detail the preferred and alternate embodiments of the present invention, including the preferred modes of operation, it is to be understood that the invention is capable of other and different embodiments, its several details are capable of modifications in various respects, and its operation could be carried out with different elements and steps, all without departing from the spirit of the invention. The drawings and description of the preferred and alternate embodiments are presently only by way of example and are be regarded as illustrative in nature and are not meant to limit the scope of the present invention which is defined by the following claims.

What is claimed:

1. A synchronous rectifier system for a power converter for providing power to a load comprising:
    a transformer having a first secondary winding;
    a first synchronous switch coupled to said transformer secondary, said first synchronous switch being operable to switch between a conducting state and a non-conducting state;
    a second synchronous switch coupled to said transformer secondary, said second synchronous switch being operable to switch between a conducting state and a non-conducting state;
    a state retention device coupled to said second synchronous switch, said state retention device being operative to allow said second synchronous switch to remain in said conduction state when the voltage across said transformer secondary approaches zero volts; and a state release switch coupled to said second synchronous switch, said state release switch being operative to direct said second synchronous switch to switch to a non-conducting state when said first synchronous switch is directed to switch to a conducting state.

2. The system according to claim 1 wherein said state retention device is operative to resist the flow of positive charge away from a switch controller of said second synchronous switch when the voltage across said secondary winding approaches zero volts.

3. The system according to claim 1 wherein said state release switch is operative to allow positive charge to flow away from a switch controller of said second synchronous switch.

4. The system according to claim 1 wherein said first synchronous switch is a MOSFET switch, said second synchronous switch is a MOSFET switch, and said state release switch is a MOSFET switch.

5. The system according to claim 4 wherein:

the drain terminal of said second synchronous switch is coupled to the first terminal of said secondary winding;

the drain terminal of said state release switch is coupled to the gate terminal of said second synchronous switch and the source terminal of said state release switch is coupled to the source terminal of said second synchronous switch;

the gate terminal of said first synchronous switch is coupled is coupled to the gate of said state release switch, the gate terminal of said first synchronous switch also being coupled to the first terminal of said secondary winding;

the source terminal of said first synchronous switch is coupled to the source terminal of said state release switch;

the drain terminal of said first synchronous switch is coupled to the second terminal of said secondary winding; and the state retention device is coupled between the drain terminal of said first synchronous switch and the gate terminal of said second synchronous switch.

6. The system according to claim 5 wherein said state retention device is a diode.

7. The system according to claim 6 wherein the anode of said diode is coupled to the drain terminal of said first synchronous switch and the cathode of said diode is coupled to the gate terminal of said second synchronous switch.

8. The system according to claim 7 further comprising a low pass filter component that includes a first inductor and a first capacitor that are coupled across said second synchronous switch.

9. The system according to claim 4 wherein said transformer further comprises a first and second auxiliary winding and wherein:

the drain terminal of said second synchronous switch is coupled to the first terminal of said secondary winding;

the drain terminal of said state release switch is coupled to the gate terminal of said second synchronous switch and the source terminal of said state release switch is coupled to the source terminal of said second synchronous switch;

the gate terminal of said first synchronous switch is coupled is coupled to the gate of said state release switch;

the source terminal of said first synchronous switch is coupled to the source terminal of said state release switch;

the drain terminal of said first synchronous switch is coupled to the second terminal of said secondary winding;

the state retention device is coupled between said first auxiliary winding and the gate terminal of said second synchronous switch;

the gate terminal of said first synchronous switch is coupled to said second auxiliary winding; and the first and second auxiliary windings are coupled at a node to the source terminal of the first synchronous switch, the source terminal of the second synchronous switch, and the source terminal of the state release switch.

10. The system according to claim 9 wherein said state retention device is a diode.

11. The system according to claim 10 wherein the anode of said diode is coupled to the first auxiliary winding and the cathode of said diode is coupled to the gate terminal of said second synchronous switch.

12. The system according to claim 11 further comprising a low pass filter component that includes a first inductor and a first capacitor that are coupled across said second synchronous switch.

13. The system according to claim 4 wherein said transformer further comprises a first auxiliary winding and wherein:

the drain terminal of said second synchronous switch is coupled to the first terminal of said secondary winding;

the drain terminal of said state release switch is coupled to the gate terminal of said second synchronous switch and the source terminal of said state release switch is coupled to the source terminal of said second synchronous switch;

the gate terminal of said first synchronous switch is coupled is coupled to the gate of said state release switch;

the source terminal of said first synchronous switch is coupled to the source terminal of said state release switch;

the drain terminal of said first synchronous switch is coupled to the second terminal of said secondary winding;

the state retention device is coupled between said first auxiliary winding and the gate terminal of said second synchronous switch;

the gate terminal of said first synchronous switch is coupled to said second auxiliary winding; and further comprising a second rectifier with its cathode coupled to said auxiliary winding and its anode coupled to a node joining the source terminal of the first synchronous switch, the source terminal of the second synchronous switch, and the source terminal of the state release switch; and a third rectifier with its anode coupled to the anode of the second rectifier and its cathode coupled to said auxiliary winding.

14. The system according to claim 13 wherein said state retention device is a diode.

15. The system according to claim 14 wherein the anode of said diode is coupled to the auxiliary winding and the cathode of said diode is coupled to the gate terminal of said second synchronous switch.

16. The system according to claim 15 further comprising a low pass filter component that includes a first inductor and a first capacitor that are coupled across said second synchronous switch.

17. The system according to claim 4 wherein:
the drain terminal of said second synchronous switch is coupled to the first terminal of said secondary winding;
the drain terminal of said state release switch is coupled to the first terminal of said secondary winding and the source terminal of said state release switch is coupled to the source terminal of said second synchronous switch;
the gate terminal of said first synchronous switch is coupled is coupled to the first terminal of said secondary winding;
the source terminal of said first synchronous switch is coupled to the source terminal of said second synchronous switch;
the drain terminal of said first synchronous switch is coupled to the gate terminal of said second synchronous switch; and
the state retention device is coupled between said secondary winding and the gate terminal of said second synchronous switch.

18. The system according to claim 17 wherein said state retention device is a diode.

19. The system according to claim 18 wherein the anode of said diode is coupled to said secondary winding and the cathode of said diode is coupled to the gate terminal of said second synchronous switch.

20. The system according to claim 19 further comprising an output filter that includes a first inductor, a second inductor, and a first capacitor, wherein:
said first inductor is coupled to the drain terminal of said second synchronous switch;
said second inductor is coupled to the drain terminal of said first synchronous switch; and
said first capacitor is coupled between a node joining the first inductor and the second inductor and a node joining the source terminals of said first synchronous switch, said second synchronous switch, and said state release switch.

21. The system according to claim 4 wherein said transformer further comprises an auxiliary winding and wherein:
the drain terminal of said second synchronous switch is coupled to the first terminal of said secondary winding;
the drain terminal of said state release switch is coupled to the first terminal of said secondary winding and the source terminal of said state release switch is coupled to the source terminal of said second synchronous switch;
the gate terminal of said first synchronous switch is coupled is coupled to the gate of said state release switch;
the source terminal of said first synchronous switch is coupled to the source terminal of said second synchronous switch;
the drain terminal of said first synchronous switch is coupled to the gate terminal of said second synchronous switch;
the state retention device is coupled between said auxiliary winding and the gate terminal of said second synchronous switch; and further comprising:
a second rectifier with its cathode coupled to said auxiliary winding and its anode coupled to a node joining the source terminal of the first synchronous switch, the source terminal of the second synchronous switch, and the source terminal of the state release switch; and
a third rectifier with its anode coupled to the node joining the source terminal of the first synchronous switch, the source terminal of the second synchronous switch, and the source terminal of the state release switch and its cathode coupled to the gate terminal of said first synchronous switch.

22. The system according to claim 21 wherein said state retention device is a diode.

23. The system according to claim 22 wherein the anode of said diode is coupled to the drain terminal of said first synchronous switch and the cathode of said diode is coupled to the gate terminal of said second synchronous switch.

24. The system according to claim 23 further comprising an output filter that includes a first inductor, a second inductor, and a first capacitor, wherein:
said first inductor is coupled to the drain terminal of said second synchronous switch;
said second inductor is coupled to the drain terminal of said first synchronous switch; and
said first capacitor is coupled between a node joining the first inductor and the second inductor and a node joining the source terminals of said first synchronous switch, said second synchronous switch, and said state release switch.

25. The system according to claim 4 wherein said transformer further comprises a second secondary winding that is coupled to the first secondary winding and wherein:
the drain terminal of said second synchronous switch is coupled to said first secondary winding;
the drain terminal and the gate terminal of said state release switch are coupled to said second secondary winding and the source terminal of said state release switch is coupled to the source terminal of said second synchronous switch;
the gate terminal of said first synchronous switch is coupled is coupled to the gate of said state release switch;
the source terminal of said first synchronous switch is coupled to the source terminal of said state release switch;
the drain terminal of said first synchronous switch is coupled to the gate terminal of said second synchronous switch; and
the state retention device is coupled between said second secondary winding and the gate terminal of said second synchronous switch.

26. The system according to claim 25 wherein said state retention device is a diode.

27. The system according to claim 26 wherein the anode of said diode is coupled to said second secondary winding and the cathode of said diode is coupled to the gate terminal of said second synchronous switch.

28. The system according to claim 27 further comprising a low pass filter component that includes a first inductor and a first capacitor that are coupled between a node joining the source terminals of said first synchronous switch, said second synchronous switch and said state release switch and a node that couples the first and second secondary windings.

29. The system according to claim 4 wherein said transformer further comprises a second secondary winding that is coupled to the first secondary winding and an auxiliary winding and wherein:

the drain terminal of said second synchronous switch is coupled to said secondary winding;

the drain terminal and the gate terminal of said state release switch are coupled to said second secondary winding and the source terminal of said state release switch is coupled to the source terminal of said second synchronous switch;

the gate terminal of said first synchronous switch is coupled is coupled to the gate of said state release switch;

the source terminal of said first synchronous switch is coupled to the source terminal of said state release switch;

the drain terminal of said first synchronous switch is coupled to the gate terminal of said second synchronous switch;

the state retention device is coupled between said auxiliary winding and the gate terminal of said second synchronous switch; and further comprising:

a second rectifier with its cathode coupled to said auxiliary winding and its anode coupled to a node joining the source terminal of the first synchronous switch, the source terminal of the second synchronous switch, and the source terminal of the state release switch; and a third rectifier with its anode coupled to the node joining the source terminal of the first synchronous switch, the source terminal of the second synchronous switch, and the source terminal of the state release switch and its cathode coupled to said auxiliary winding.

30. The system according to claim 29 wherein said state retention device is a diode.

31. The system according to claim 30 wherein the anode of said diode is coupled to said auxiliary winding and the cathode of said diode is coupled to the gate terminal of said second synchronous switch.

32. The system according to claim 31 further comprising a low pass filter component that includes a first inductor and a first capacitor that are coupled between a node joining the source terminals of said first synchronous switch, said second synchronous switch and said state release switch and a node that couples the first and second secondary windings.

33. A D.C. to D.C. power converter comprising:

a transformer having a first secondary winding;

a first synchronous switch coupled to said transformer secondary, said first synchronous switch being operable to switch between a conducting state and a non-conducting state;

a second synchronous switch coupled to said transformer secondary, said second synchronous switch being operable to switch between a conducting state and a non-conducting state;

a state retention device coupled to said second synchronous switch, said state retention device being operative to allow said second synchronous switch to remain in said conduction state when the voltage across said transformer secondary approaches zero volts; and a state release switch coupled to said second synchronous switch, said state release switch being operative to direct said second synchronous switch to switch to a non-conducting state when said first synchronous switch is directed to switch to a conducting state.

34. The system according to claim 33 wherein said state retention device is operative to resist the flow of positive charge away from a switch controller of said second synchronous switch when the voltage across said secondary winding approaches zero volts.

35. The system according to claim 33 wherein said state release switch is operative to allow positive charge to flow away from a switch controller of said second synchronous switch.

36. The system according to claim 33 wherein said first synchronous switch is a MOSFET switch, said second synchronous switch is a MOSFET switch, and said state release switch is a MOSFET switch.

37. A synchronous rectifier system for a power converter for providing power to a load comprising:

a power transfer device having a first terminal and a second terminal;

an output filter for providing power to the load;

a first synchronous switch coupled between the second terminal of said power transfer device and said output filter, said first synchronous switch including a first switch control component that is coupled to the first terminal of said power transfer device, said first synchronous switch being operable to enter a conduction state in response to a positive voltage being applied to said first switch control component;

a second synchronous switch coupled across said output filter and having a terminal coupled to the first terminal of said power transfer device, said second synchronous switch including a second switch control component that is coupled to the second terminal of said power transfer device, said second synchronous switch being operable to enter a conduction state in response to a positive voltage being applied to said second switch control component;

a state retention device coupled between said second switch control component and the second terminal of said power transfer device, said state retention device being operable to resist the flow of positive charge away from said second switch control component when the voltage at said second terminal of said power transfer device approaches zero; and a state release switch coupled to said second switch control component, said state release switch being operable to switch said second synchronous switch to a non-conducting state when said first synchronous switch is switched to a conducting state.

38. The system according to claim 37 wherein said power transfer device is a transformer secondary.

39. The system according to claim 37 wherein said output filter is a low pass filter comprising an inductor and a capacitor.

40. The system according to claim 37 wherein said first synchronous switch is a MOSFET, said second synchronous switch is a MOSFET, and said state release switch is a MOSFET.

41. The system according to claim 40 wherein said first switch control component and said second switch control component are MOSFET gates.

42. The system according to claim 37 wherein said state retention device is a diode.

* * * * *

UNITED STATES PATENT AND TRADEMARK OFFICE
CERTIFICATE OF CORRECTION

PATENT NO.     : 6,377,477 B1
DATED          : April 23, 2002
INVENTOR(S)    : Xie et al.

It is certified that error appears in the above-identified patent and that said Letters Patent is hereby corrected as shown below:

Title page,
Item [75], invenotrs, the inventor's name should read as follows:
-- Xue Fei Xie
Franki Ngai Kit Poon
Joe Chui Pong Liu
Bryan Man Hay Pong --

Signed and Sealed this

Twenty-fifth Day of February, 2003

JAMES E. ROGAN
*Director of the United States Patent and Trademark Office*